(12) United States Patent
Hoppel

(10) Patent No.: US 9,137,947 B2
(45) Date of Patent: Sep. 22, 2015

(54) METHOD OF USING AN ATTACHMENT ASSEMBLY AND A SELF-PROPELLED POWER UNIT

(71) Applicant: GREEN INDUSTRY INNOVATORS, L.L.C., Louisville, OH (US)

(72) Inventor: Steffon Hoppel, Louisville, OH (US)

(73) Assignee: Green Industry Innovators, L.L.C., Louisville, OH (US)

( * ) Notice: Subject to any disclaimer, the term of this patent is extended or adjusted under 35 U.S.C. 154(b) by 8 days.

(21) Appl. No.: 14/087,651

(22) Filed: Nov. 22, 2013

(65) Prior Publication Data
US 2014/0075905 A1    Mar. 20, 2014

Related U.S. Application Data

(63) Continuation of application No. 13/097,760, filed on Apr. 29, 2011.

(51) Int. Cl.
| | |
|---|---|
| *B65G 47/18* | (2006.01) |
| *A01D 43/063* | (2006.01) |
| *B60P 1/38* | (2006.01) |
| *A01D 42/00* | (2006.01) |
| *B60P 1/36* | (2006.01) |
| *B60P 1/64* | (2006.01) |
| *B65G 15/30* | (2006.01) |
| *A01D 43/077* | (2006.01) |
| *B60B 33/00* | (2006.01) |

(52) U.S. Cl.
CPC ............. *A01D 43/063* (2013.01); *A01D 42/00* (2013.01); *A01D 42/005* (2013.01); *A01D 43/077* (2013.01); *B60B 33/001* (2013.01); *B60P 1/36* (2013.01); *B60P 1/38* (2013.01); *B60P 1/6418* (2013.01); *B65G 15/30* (2013.01); *B65G 47/18* (2013.01); *Y10S 56/09* (2013.01)

(58) Field of Classification Search
None
See application file for complete search history.

(56) References Cited

U.S. PATENT DOCUMENTS

| | | |
|---|---|---|
| 710,611 A | 10/1902 | Ray |
| 845,078 A | 2/1907 | Gritton |
| 1,515,328 A | 11/1924 | Barkmann et al. |
| 2,166,846 A | 7/1939 | McCalley |
| 2,293,486 A | 8/1942 | Barrett |
| 2,656,034 A | 10/1953 | Filsinger |
| 2,834,487 A | 5/1958 | Gaddis |

(Continued)

OTHER PUBLICATIONS

Dakota Peat & Equipment, Dakota Turf Tender 410 Pull Type, http://www.dakotapeat.com/equipment/410nnounted.php, printed Feb. 8, 2011.

(Continued)

*Primary Examiner* — William R Harp
(74) *Attorney, Agent, or Firm* — Sand & Sebolt

(57) ABSTRACT

The invention relates to a self-propelled outdoor power equipment unit, an attachment for use with such a unit and associated methods. The unit may be in the form of a mower having a mower deck. The attachment includes a hopper and conveyor assembly for discharging particulate material from the hopper. The conveyor assembly has operational and stored positions, the latter of which provides a narrower profile of the attachment and unit. The attachment and mower deck may be mounted on the frame of the unit together or separately. The attachment is configured for rapid mounting and dismounting on the frame of the unit, and provides additional functionality to a mower or other unit on which the attachment is mounted.

22 Claims, 22 Drawing Sheets

(56) References Cited

U.S. PATENT DOCUMENTS

| | | | |
|---|---|---|---|
| 3,370,423 | A | 2/1968 | Vaughan |
| 4,212,428 | A | 7/1980 | Walker |
| 4,518,373 | A | 5/1985 | Roth |
| 5,064,338 | A | 11/1991 | Lawrence |
| 5,090,550 | A | 2/1992 | Axmann |
| 5,156,218 | A | 10/1992 | Metzler et al. |
| 5,244,333 | A | 9/1993 | Byrne |
| 5,513,743 | A | 5/1996 | Brink |
| 6,502,771 | B1 | 1/2003 | Wyne |
| 6,637,678 | B2 | 10/2003 | Wyne |
| 2010/0133365 | A1 | 6/2010 | Bailey et al. |

OTHER PUBLICATIONS

Turfco, CR-10 Large Area Topdresser & Material Handler—Turfco, http://www.turfco.com/products/Large-Area-Topdressers-Material-Handler/CR-10-Large-Area-Topdresser-Material-Handler-P2C8.aspx, printed Feb. 7, 2011.

Earth & Turf—America's Compact Topdresser Company, 100 SP Self-Propelled Topdresser, http://www.earthandturf.com/100sp.htm, printed Feb. 7, 2011.

Earth & Turf—America's Compact Topdresser Company, MultiSpread 200, http://www.earthandturf.com/ms200.htm, printed Feb. 7, 2011.

Earth & Turf—America's Compact Topdresser Company, MultiSpread 320, http://www.earthandturf.com/ms320.htm, printed Feb. 7, 2011.

_US 9,137,947 B2_

METHOD OF USING AN ATTACHMENT ASSEMBLY AND A SELF-PROPELLED POWER UNIT

CROSS-REFERENCE TO RELATED APPLICATIONS

This is a Continuation of U.S. patent application Ser. No. 13/097,760 filed Apr. 29, 2011, the entire specification of which is incorporated herein by reference.

BACKGROUND OF THE INVENTION

1. Technical Field

The present invention is related generally to outdoor power equipment and attachments for use therewith. More particularly, the present invention typically includes a hopper, conveyor belt assembly and hydraulic system typically powered by the engine of the outdoor power equipment. Specifically, the invention is related to such equipment which is configured to throw mulch or other particulate material from within the hopper while the equipment is driven along the ground.

2. Background Information

There is a wide variety of self-propelled outdoor power equipment, such as those used in the landscape, lawn and garden, forestry and utility equipment industries. These self-propelled units may be walk-behind units, stand-on units or sit-on units which typically include three or four wheels. By way of example, such self-propelled units may be in the form of lawnmowers, leaf blowers, snow blowers or throwers, fertilizer spreaders, topdressers, aerators, power brooms, garden tractors, utility vehicles and the like. Many of these units are within the category of lawn care equipment or turf care machines. Some of these units, such as power mowers, may have a zero turning radius whereby they are sometimes referred to as "zero turn" or "z turn" mowers or the like. Many of these units are configured for a single function, such as cutting grass, throwing snow or spreading fertilizer. However, other units may be configured to achieve more than one function, and may include attachments to that end. Many such attachments are configured to be towed or pushed by the self-propelled unit whereby such attachments typically include wheels. Caster or broadcast spreaders have been configured to mount on self-propelled units, such as those described in U.S. Pat. Nos. 6,502,771 and 6,637,678 both of which were granted to Wyne. In addition, U.S. Pat. No. 5,156,218 granted to Metzler et al. is directed to a landscape edging attachment. Furthermore, topdressers include models utilizing a conveyor belt to deliver particulate material through a rotating brush for distribution onto the ground, as well as those which use a rapidly spinning bar having steel plates secured thereto which strike the particulate material for distribution thereof. In addition, one unit sold under the name "Dakota 410 Rear Conveyor" utilizes a hopper which feeds particulate material onto a rear conveyor belt external to the hopper such that the external conveyor belt feeds the material outwardly to the side of the self-propelled unit. One of the drawbacks to the rear conveyor is that the operator must look back over his or her shoulder while driving the self-propelled unit in order to ensure the proper distribution from the rear conveyor. The present invention addresses this and other needs in the art.

BRIEF SUMMARY OF THE INVENTION

The present invention provides an attachment for use with a self-propelled outdoor power equipment unit comprising a frame, an engine mounted on the frame, and drive wheels rotatably mounted on the frame and powered by the engine, the attachment comprising: a hopper which defines an interior chamber and is adapted to be removably mounted on the frame; and a conveyor belt support assembly; a conveyor belt revolvably mounted on the support assembly for discharging particulate material from the interior chamber; a first section of the support assembly; a second section of the support assembly which is movable relative to the first section of the support assembly between an operational position and a stored position.

The present invention also provides a method comprising the steps of: detaching a mower deck from a frame of a mower; mounting on the frame an attachment which comprises a hopper and conveyor belt; revolving the conveyor belt to discharge particulate material from the hopper.

The present invention further provides an attachment for use with a self-propelled outdoor power equipment unit comprising a frame, an engine mounted on the frame, and drive wheels rotatably mounted on the frame and powered by the engine, the attachment comprising: a hopper which defines an interior chamber; a mounting mechanism adapted for mounting the hopper on the unit; and a hydraulic reservoir mounted on the hopper whereby the hopper serves as a heat sink for hydraulic fluid within the reservoir.

BRIEF DESCRIPTION OF THE SEVERAL VIEWS OF THE DRAWINGS

A preferred embodiment of the invention, illustrated of the best mode in which Applicant contemplates applying the principles, is set forth in the following description and is shown in the drawings and is particularly and distinctly pointed out and set forth in the appended claims.

Similar numbers refer to similar parts throughout the drawings.

DETAILED DESCRIPTION OF THE INVENTION

Figure 1:
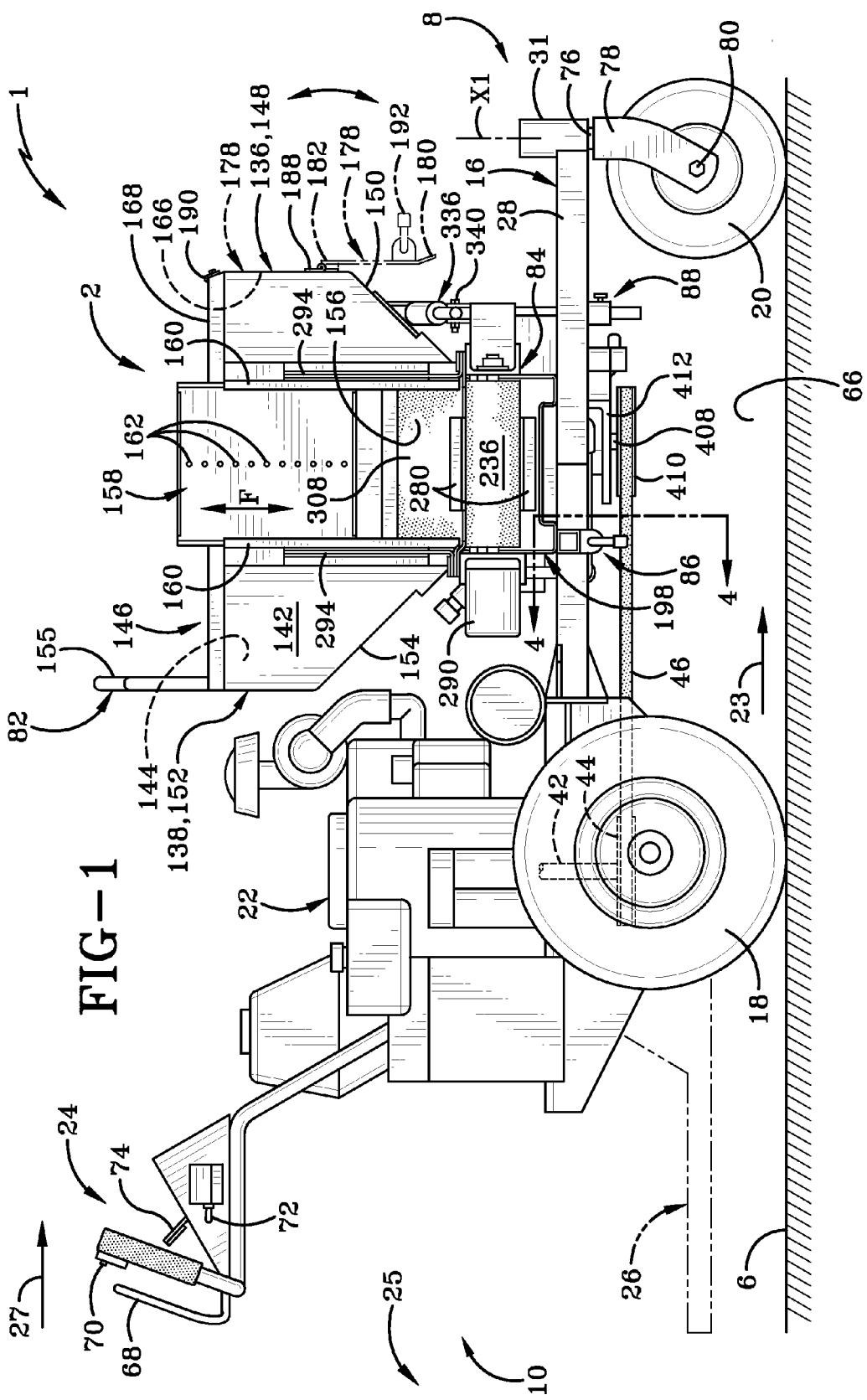
FIG. 1 is a side elevational view of the outdoor power equipment unit of the present invention with the attachment secured thereon.
Figure 2:
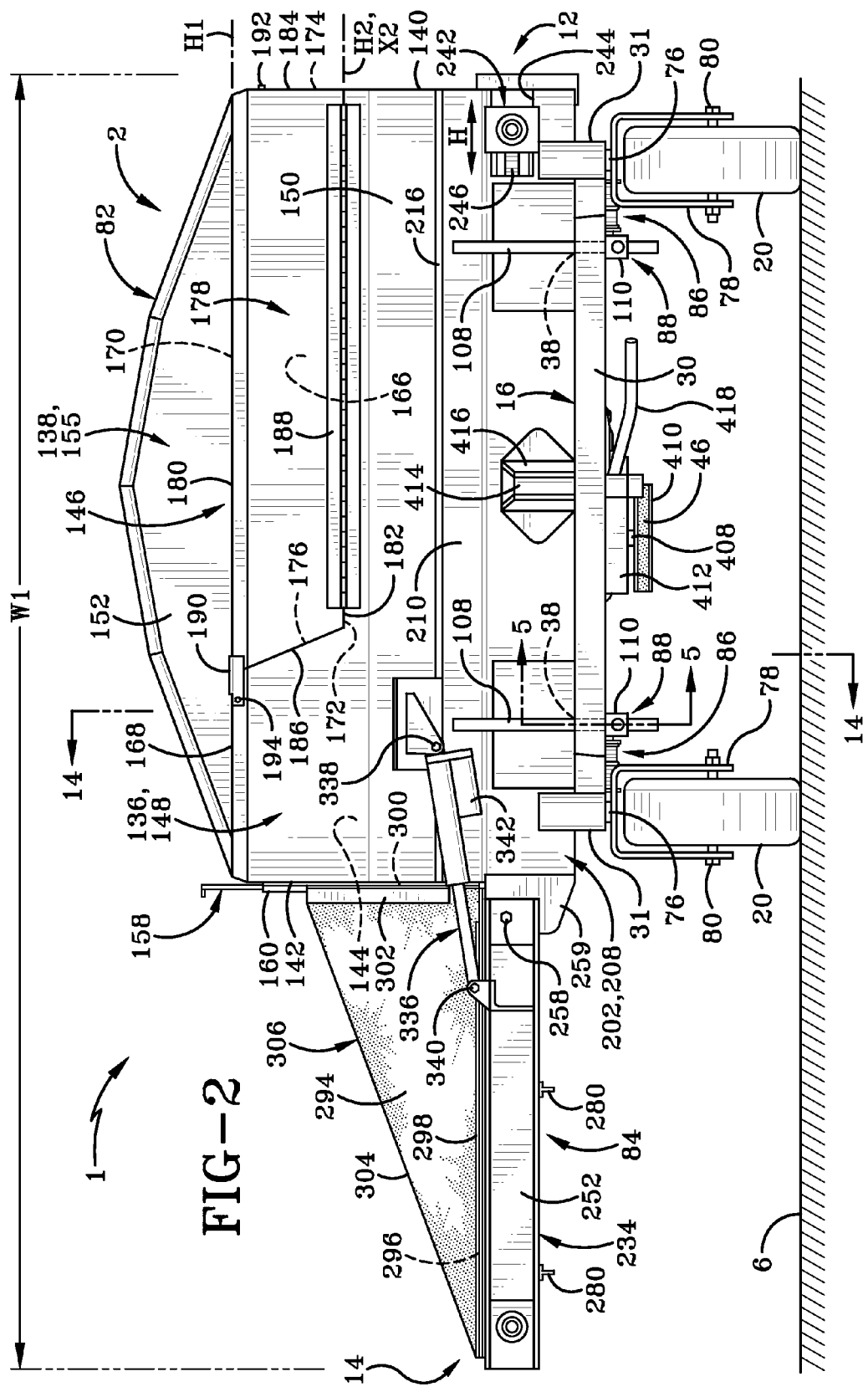
FIG. 2 is a front elevational view of the unit.
Figure 3:
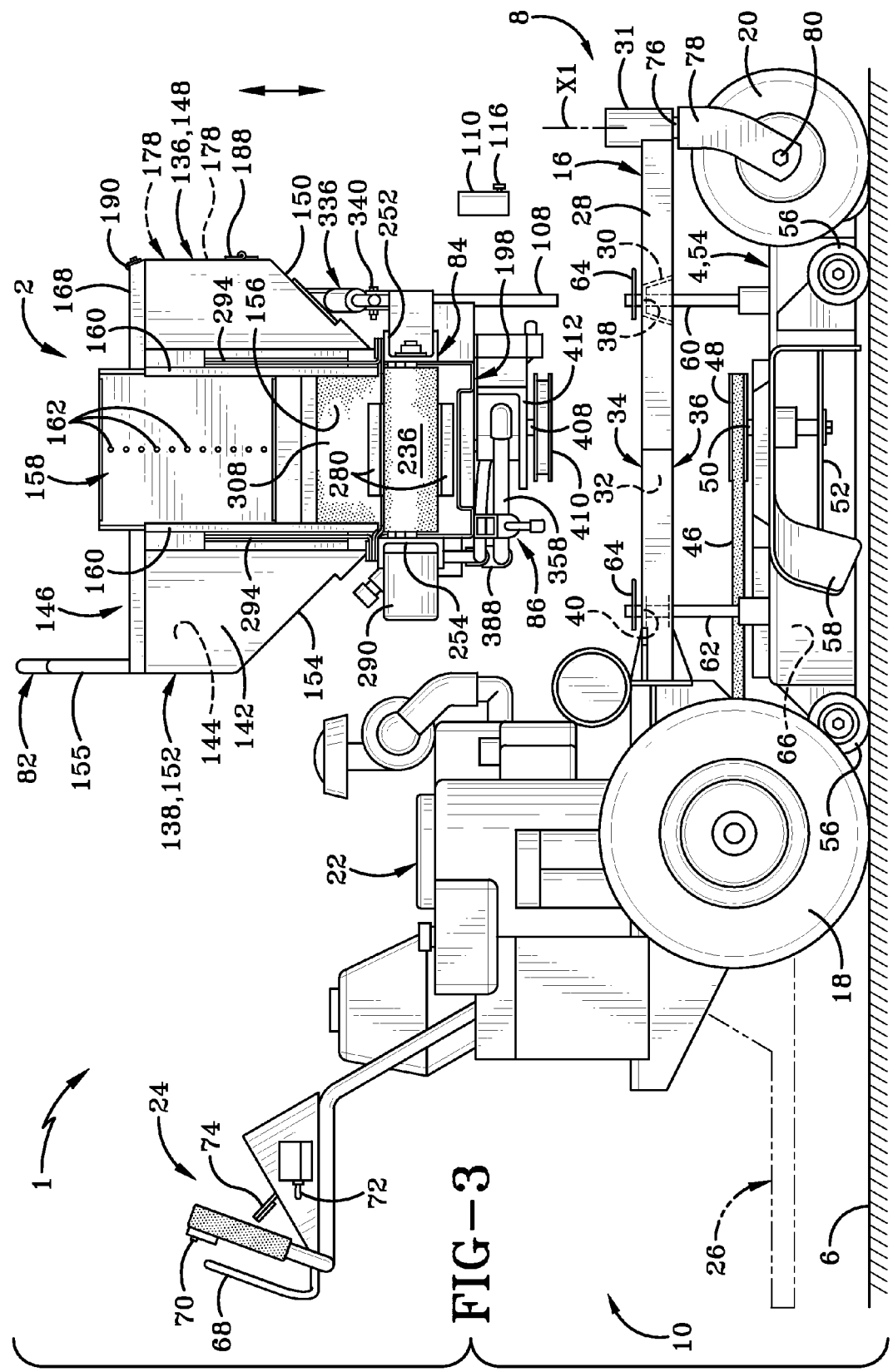
FIG. 3 is a side elevational view similar to FIG. 1 showing the attachment removed from the front of the unit and a mower deck mounted on the frame.

The self-propelled outdoor power equipment unit of the present invention is shown generally at 1 in FIGS. 1-3. Unit 1 may include one or more functional assemblies that perform specific functions or tasks in addition to the self-propelled capability of the unit. For example, unit 1 may include a functional assembly in the form of a hopper and conveyor assembly 2, a mower deck 4 (FIGS. 3, 6) or both. Such functional assemblies may be configured for permanent attachment to the frame of the unit or removably mounted thereon. Removable functional assemblies may be configured for relatively slow removal or relatively rapid removal. The exemplary embodiment illustrates that assembly 2 and mower deck 4 are both configured to be quickly removed or attached to the frame of unit 1 as discussed further below. Unit 1 is configured to travel along the ground 6 while one or both of assembly 2 and mower deck 4 operates to perform its specific functions. Assembly 2 and mower deck 4 are also operable when unit 1 travel is stopped.

Unit 1 has a front 8 and a back 10 defining therebetween a longitudinal direction of the unit. Unit 1 further includes a left side 12 and a right side 14 which define therebetween an axial direction of the unit. Unit 1 includes a rigid frame 16 typically formed of metal and extending from adjacent front 8 to adjacent back 10. Left and right powered or drive wheels 18 (only the right wheel shown) are rotatably mounted on frame 16 generally adjacent the back end 10. Left and right non-powered or driven wheels 20 are rotatably mounted on frame 16 adjacent front end 8. A typically fuel powered engine 22 is mounted on frame 16 generally adjacent the back end for powering rotation of drive wheels 18. Wheels 18 and 20 are ground-engaging wheels which define the bottom of unit 1 and engage and roll on ground 6 to facilitate its travel in the forward (Arrow 23) and rearward directions as well as to the left and to the right. In the exemplary embodiment, unit 1 is configured as a zero turning radius machine although it may be configured with steering capabilities which provide for a wider turning range. Unit 1 includes a control assembly 24 mounted adjacent back 10 for controlling the various functions of unit 1.

Unit 1 may be configured as a walk-behind unit or model, as illustrated in solid lines in FIGS. 1 and 3, or may be configured with an operator support platform 26 (dashed lines) which is shown here as a standing platform on which an operator of machine 1 stands during operation, although platform 26 may also represent a seat on which the operator sits during operation of the machine. Where unit 1 is a walk-behind model, the operator will walk behind or stand in an operator position 25 adjacent and directly behind the machine and behind the control assembly 24 with his or her hands on the appropriate controls of assembly 24. Alternately, the operator position may be atop platform 26 or the seat represented thereby with appropriate controls just forward of the operator position. In any of these cases, assembly 2 is forward of the operator position whereby the operator faces forward, as illustrated at Arrow 27, whereby the operator can see the operation of assembly 2 as unit 1 travels forward. This configuration eliminates the difficulty associated with a rear conveyor in which the operator must look rearwardly over his or her shoulder while driving the unit forward.

Figure 11:
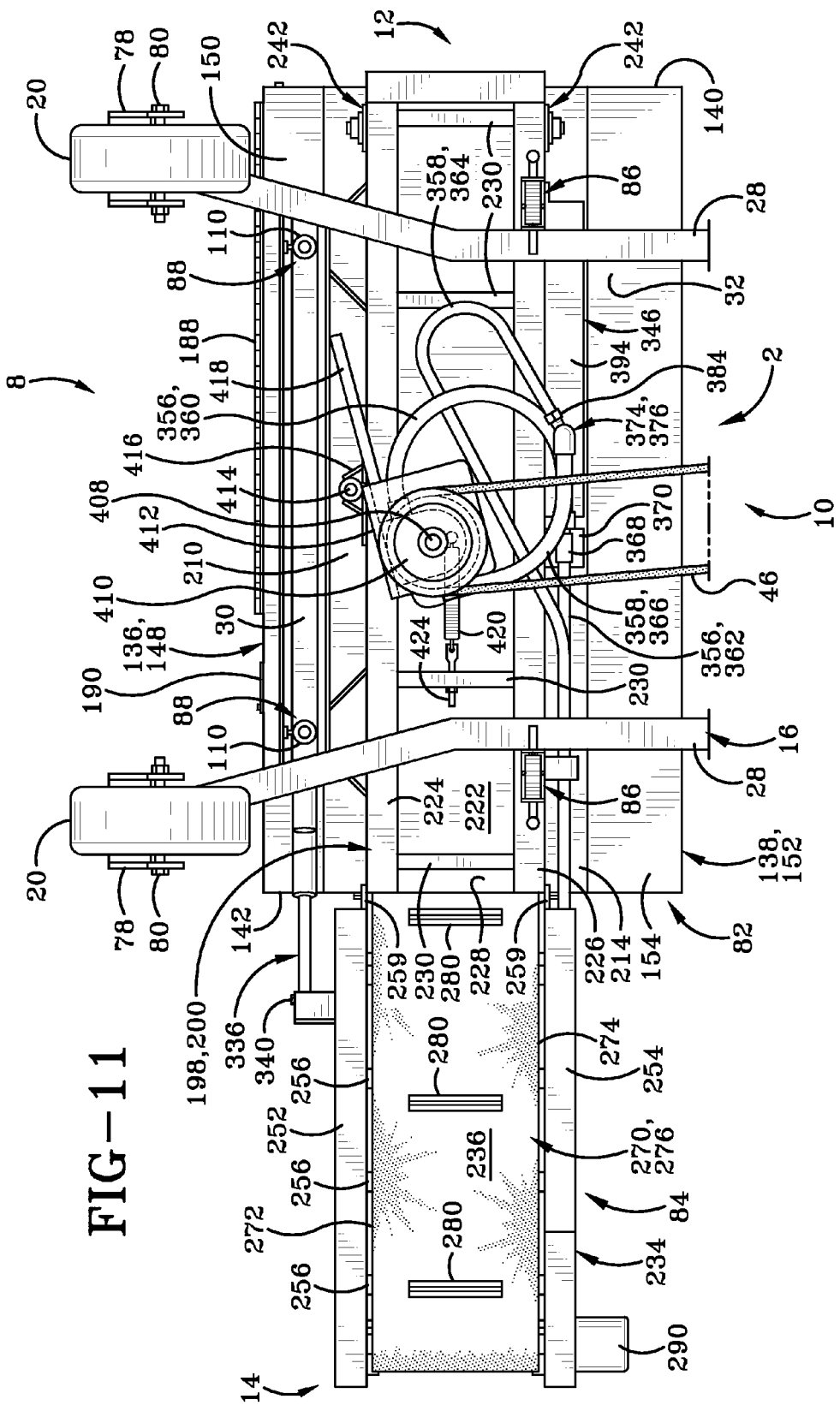
FIG. 11 is a bottom plan view of the portion of the unit shown in FIGS. 9 and 10 and shows the hydraulic pump and associated sheave in the mounted or tightened position with the drive belt mounted on the sheave.

Frame 16 includes left and right substantially horizontal longitudinal beams or rails 28 (both shown in FIG. 11) which are generally parallel although FIG. 11 illustrates segments of rails 28 which are parallel and forward segments which taper forward and away from each other somewhat. Frame 16 further includes left and right front cylindrical caster mount sleeves 31 which are vertically oriented and hollow and thus define cylindrical passages or holes. Left and right sleeves 31 are secured to rails 28 adjacent their respective front ends adjacent front end 8 of unit 1. Frame 16 further includes a front axial crossbar 30, which is one of a plurality of substantially horizontal crossbars which extend between and are rigidly secured to rails 28. Rails 28 define therebetween an open space 32 (FIG. 11) which extends rearwardly from front crossbar 30 to adjacent the front of engine 22. Space 32 serves as a through opening having top and bottom entrance openings 34 and 36 (FIG. 3) such that portions of assembly 2 or other components may pass into and through space 32 from the top or bottom. Left and right forward mounting holes 38 (FIG. 2) and rearward mounting holes 40 are formed in frame 16 and are used for mounting mower deck 4 on frame 16. In the embodiment illustrated in FIGS. 1-3, forward holes 38 are also used in mounting attachment 2 on frame 16. Holes 38 and 40 are typically through holes formed through a horizontal beam or plate, and in the exemplary embodiment forward holes 38 are formed through front crossbar 30.

In addition to powering the rotation of drive wheels 18, engine 22 has a drive shaft 42 and a sheave 44 secured to and rotatable with drive shaft 42 about a vertical axis. A closed loop drive belt 46 is revolvably mounted on and engages sheave 44 as well as a sheave 48 of mower deck 4 (FIG. 3) when deck 4 is mounted on frame 16. Sheave 48 is secured to another shaft 50 and is rotatable therewith about a vertical axis passing through shaft 50. Mower deck 4 includes one or more mower blades 52 which rotate about a respective vertical axis and are rotatably driven by the rotation of sheave 48 and axle 50. Although a single mower blade 52 may be used on certain models, it is common for commercial mowers to include two or three blades 52 which are offset from one another such that one of the blades 52 is secured to shaft 50 while the other blade or blades are secured to respective shafts having respective sheaves which are driven by another drive belt, as is well known in the art. Mower deck 4 includes a rigid heavy duty housing 54 on which the mower blades are rotatably mounted and on which several ground engaging mower deck wheels 56 are rotatably mounted to facilitate maintaining the mower deck and blades at the proper height during operation. Deck 4 further includes a discharge chute 58 typically pivotally mounted on housing 4 and extending outwardly to the side through which grass clippings and the like are discharged during the mowing process. In the exemplary embodiment, unit 1 without assembly 2 is configured as a lawnmower with which the operator cuts grass of ground 6 with blades 52.

A mounting assembly is provided for mounting mower deck 4 on frame 16. In the exemplary embodiment, this mounting assembly includes left and right front rods 60 and left and right rear rods 62 (only the right rod shown) typically pivotally mounted on housing 54 and extend vertically upwardly therefrom when deck 4 is mounted on frame 16. Cotter pins 64 or the like are used to secure rods 60 and 62 on frame 16 in a standard fashion and thus serve as stops which engage the top of the corresponding beam or other portion of frame 16 through which holes 38 and 40 are formed to limit the downward movement of deck 4 relative to frame 16. Rods 60 and 62 are respectively slidably received within holes 38 and 40 such that rods 60 and 62 may slide upwardly and downwardly within said holes to allow for some vertical adjustment of deck 4 during operation. The mounting of deck 4 on frame 16 thus is relatively simple, and involves the insertion of rods 60 and 62 upwardly through holes 38 and 40 respectively and the insertion of cotter pins 64 through respective holes formed adjacent the top of rods 60 and 62. Belt 46 is also mounted around sheaves 44 and 48 when deck 4 is mounted on frame 16. The removal of deck 4 from frame 16 thus involves the opposite steps, namely removing belt 46 from sheave 48, removing cotter pins 64 and lowering rods 60 and 62 downwardly out of holes 38 and 40.

Mower deck 4 is mounted within a mower deck mounting space 66 which is defined by the configuration of deck 4 when mounted on frame 16 and is typically entirely lower than rails 28. When mower deck 4 is removed from frame 16, space 66 is thus an open space. Deck 4 and space 66 extend longitudinally as viewed from beside from adjacent rear drive wheels 18 to adjacent front driven wheels 20, and in the axial direction from adjacent the left wheels 18 and 20 to adjacent the right wheels 18 and 20. In the exemplary embodiment, deck 4 extends outwardly to the left beyond the left wheels 18 and 20 and left longitudinal rail 28 and outwardly to the right beyond the right wheels 18 and 20 and right longitudinal rail 28. A substantial portion of deck 4 and space 66 is directly below space 32 with portions also directly below rails 28 and crossbar 30. Deck 4 and space 66 are for the most part forward of engine 22 and rear wheels 18 and mostly rearward of front wheels 20.

Control assembly 24 includes a control panel mounted on handle bars or other supporting structure secured to frame 16. A plurality of controls are mounted on the control panel, including a drive wheel control 68, a conveyor belt control 70, a conveyor extension control 72 and a throttle 74. Although only one is shown, the drive wheel control typically includes a left and right drive wheel control 68 for respectively controlling the driving rotation of the left and right drive wheels 18. A gear shift, ignition switch and other controls may be mounted on the control panel although they are not shown in the figures. Throttle 74 controls the speed or RPMs of engine 22 and consequently the speed of rotation or RPMs of shaft 42 and sheave 44, which in the exemplary embodiment is directly proportional to the RPMs of engine 22. The rotation of sheave 48, 50 and blade or blades 52 is thus also directly proportional to the speed or RPMs of engine 22.

In the exemplary embodiment, wheels 20 are caster wheels which are thus respectively part of left and right caster wheel assemblies. Each of the caster wheel assemblies includes a pivot 76, a caster wheel bracket 70 which is rigidly secured to and extends downwardly from pivot 76 and an axle 80 about which each wheel 20 is rotatably mounted. More particularly, pivot 76 typically includes a substantially cylindrical rod which is rotatably received within caster mount sleeve 31 of frame 16 whereby the entire caster wheel assembly is rotatable about a vertical axis X1 passing through pivot 76. Caster wheel bracket 78 is a generally inverted U-shaped structure having a generally horizontal upper portion and a pair of spaced legs extending downwardly therefrom whereby axle 80 extends between the legs of the bracket so that each wheel 20 is rotatable about a substantially horizontal axis.

Figure 6:
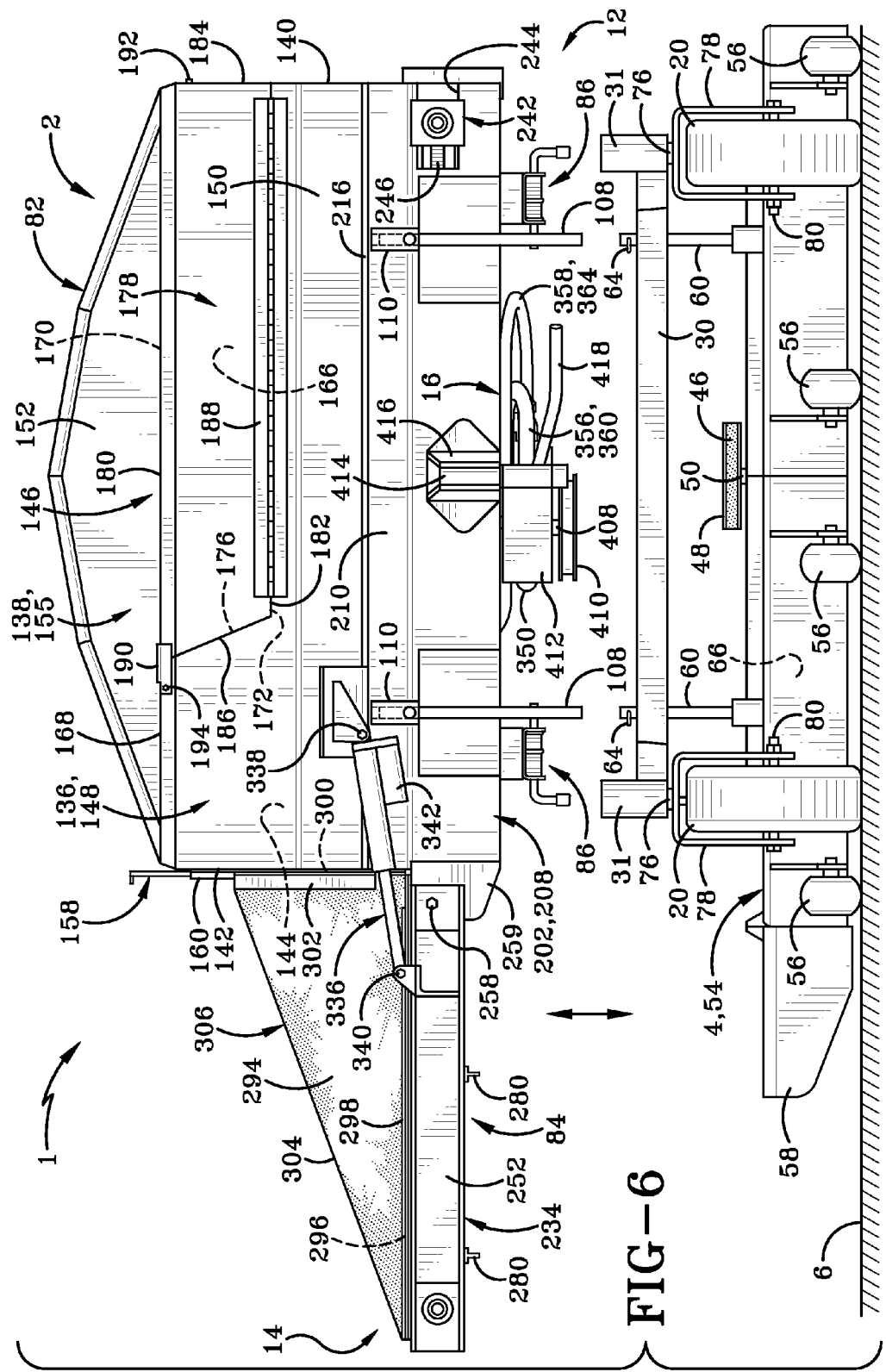
FIG. 6 is a front elevational view corresponding to the configuration in FIG. 3.

In accordance with the invention, assembly 2 is mounted on frame 16, and in the exemplary embodiment is removably mounted thereon forward of rear wheels 18, engine 22, control assembly 24 and the operator position shown at 25 or atop the seat or platform 26. FIGS. 1 and 2 show the attached or mounted position of assembly 2 while FIGS. 3 and 6 show a dismounted or detached position of assembly 2. The primary components of assembly 2 are a rigid hopper 82 formed primarily of metal and a conveyor assembly or conveyor belt assembly 84 which is secured to hopper 84 adjacent its lower end for discharging mulch or other particulate material from within hopper 82. Assembly 2 includes left and right rear mounting mechanisms 86 which are respectively mounted along the bottom of hopper 82 respectively adjacent the left and right ends thereof. Left and right front mounting mechanisms 88 are also provided for mounting assembly 2 on frame 16. When assembly 2 is mounted on frame 16, hopper 82 is fixed relative to the frame 16.

Figure 4:
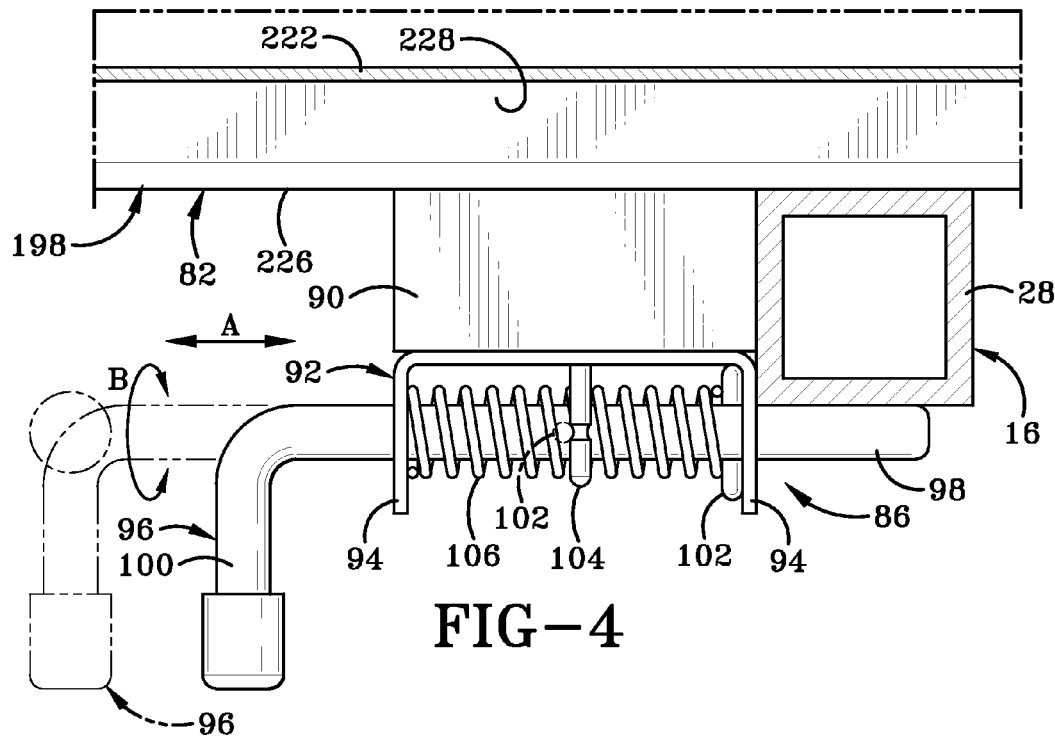
FIG. 4 is an enlarged sectional view taken on line 4-4 of FIG. 1 showing one of the rear mounting mechanisms.

Each rear mounting mechanism 86 (FIG. 4) includes a rigid tubular mounting block 90 which is rigidly secured to and extends downwardly from the bottom of hopper 82. Mechanism 86 further includes a rigid inverted U-shaped mounting bracket 92 which is rigidly secured to and extends downwardly from block 90 and includes a pair of spaced downwardly extending legs 94. A rigid L-shaped mounting member 96 has a horizontal first leg 98 and a second leg 100 which is secured to the outer end of leg 98 and extends perpendicularly therefrom. A rigid pin 102 passes through a hole formed in leg 98 and extends radially outwardly therefrom. A pair of rigid pins 104 (only one shown) are secured to the mounting bracket 92 and extend downwardly about midway between legs 94. A coil spring 106 encircles a portion of leg 98 and extends from the outer leg 94 to pin 102. Arrow A in FIG. 4 illustrates that mounting member 96 is movable horizontally inwardly and outwardly between a securing or mounting position shown in solid lines and an unsecured position shown in dashed lines. More particularly, each of legs 94 defines a hole through which leg 98 passes whereby leg 98 is slidable inwardly and outwardly and also rotatable (Arrow B) within said holes.

In the secured position, the inner portion of leg 98 is positioned directly below the corresponding rail 28 and serves as a stop which engages the bottom of rail 28 to prevent upward movement of assembly 2, thereby mounting assembly 2 on frame 16. When assembly 2 is mounted on rail 16, the bottom of hopper 18 is seated on the top of rails 28 and blocks 90 and/or the inner leg 94 is closely adjacent or abuts the respective rail to minimize or eliminate axial side to side movement of hopper 82. In the unsecured position of mounting member 96, leg 98 is withdrawn to the degree that it is no longer directly beneath rail 28 whereby a sufficient upper force allows assembly 2 to be lifted upwardly off of frame 16. For convenience, the rotation of member 96 when pin 102 moves beyond pins 104 with spring 106 compressed allows pin 102 to engage pins 104 whereby pin 102 and pins 104 serve as retaining members to retain the locking member 96 in the unsecured position. Spring 106 biases mounting member 96 to the secured position when pins 102 and 104 do not engage one another. In the unsecured position, spring 106 biases pin 102 against retaining pins 104 within the notch formed in each pin 104. When assembly 2 is used as a retrofit attachment, the mounting mechanism 86 thus provides a mounting mechanism which does not require any alteration of the frame 16 or other portions of unit 1 which would void the manufacturer's warranty on the original unit. Thus, no holes need to be drilled in the frame or other portions of unit 1 in order to attach assembly 2 to frame 16. In addition, rear mounting mechanism 86 provides the ability to rapidly mount or dismount assembly 2 on frame 16.

Figure 5:
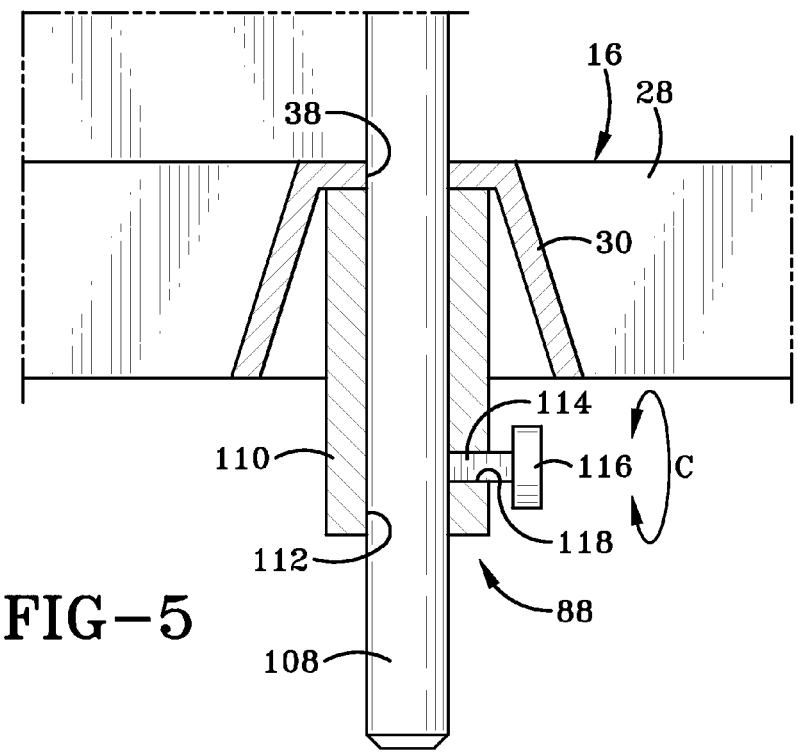
FIG. 5 is an enlarged sectional view taken on line 5-5 of FIG. 2 showing a portion of one of the front mounting mechanisms.

Each front mounting mechanism 88 (FIG. 5) includes a mounting member in the form of a rigid vertical rod 108 which is rigidly secured via a mounting bracket to the front of the lower portion of hopper 82 and extends downwardly below the bottom of the hopper to a bottom terminal end. Rod 108 is disposed within hole 38 when assembly 2 is attached to frame 16. Thus, rod 60 for mounting mower deck 4 must be removed from hole 38 in order to insert rod 108 into hole 38. Mechanism 88 further includes a rigid cylindrical sleeve 110 defining a vertical through passage or hole 112 which receives rod 108. The top of sleeve 110 abuts or is closely adjacent a downwardly facing surface of crossbar 30 at the bottom of hole 38 in the secured position to prevent upward movement of rod 108 out of hole 38. Mechanism 108 further includes a threaded member including a thread shaft 114 and an enlarged head 116 such that shaft 114 threadedly engages a threaded hole 118 extending from the outer surface of sleeve 110 to the inner surface which defines hole 112. Head 116 is typically knurled to facilitate the rotational threading of threaded member into or out of hole 118 by simple manual engagement without the use of tools. The rotation of the threaded member is illustrated at Arrow C in FIG. 5.

Thus, assembly 2 is attached to frame 16 by inserting each rod 108 downwardly through a respective hole 38, then sliding sleeve 110 upwardly from the bottom terminal end of rod 108 until the top of sleeve 110 abuts or is closely adjacent the downwardly facing surface of crossbar 30. At this point, the threaded member is rotated by the threaded engagement between shaft 114 and threaded hole 118 causes the tip of the shaft to engage the outer surface of rod 108 in order to secure sleeve 110 on rod 108. Detachment of assembly 2 thus involves the reverse procedure in which the threaded member is unscrewed so that sleeve 110 can be slid downwardly off of rod 108 and rod 108 may be lifted upwardly out of hole 38. As with the rear mounting mechanism 86, front mounting mechanism 88 thus allows for the mounting and dismounting of assembly 2 on frame 16 without voiding a manufacturer's warranty by drilling holes in the original unit or otherwise damaging the unit. Conveniently for temporary storage purposes, each sleeve 110 and the corresponding threaded member may be mounted atop an upper end of the corresponding rod 108 by sliding the sleeve over the upper end and tightening the screw to secure sleeve on rod 108, as illustrated in FIG. 6. Although rod 108 is inserted through the same holes 38 which are used to mount the mower deck via rods 60, other suitable mounting mechanisms may be used.

Figure 7:
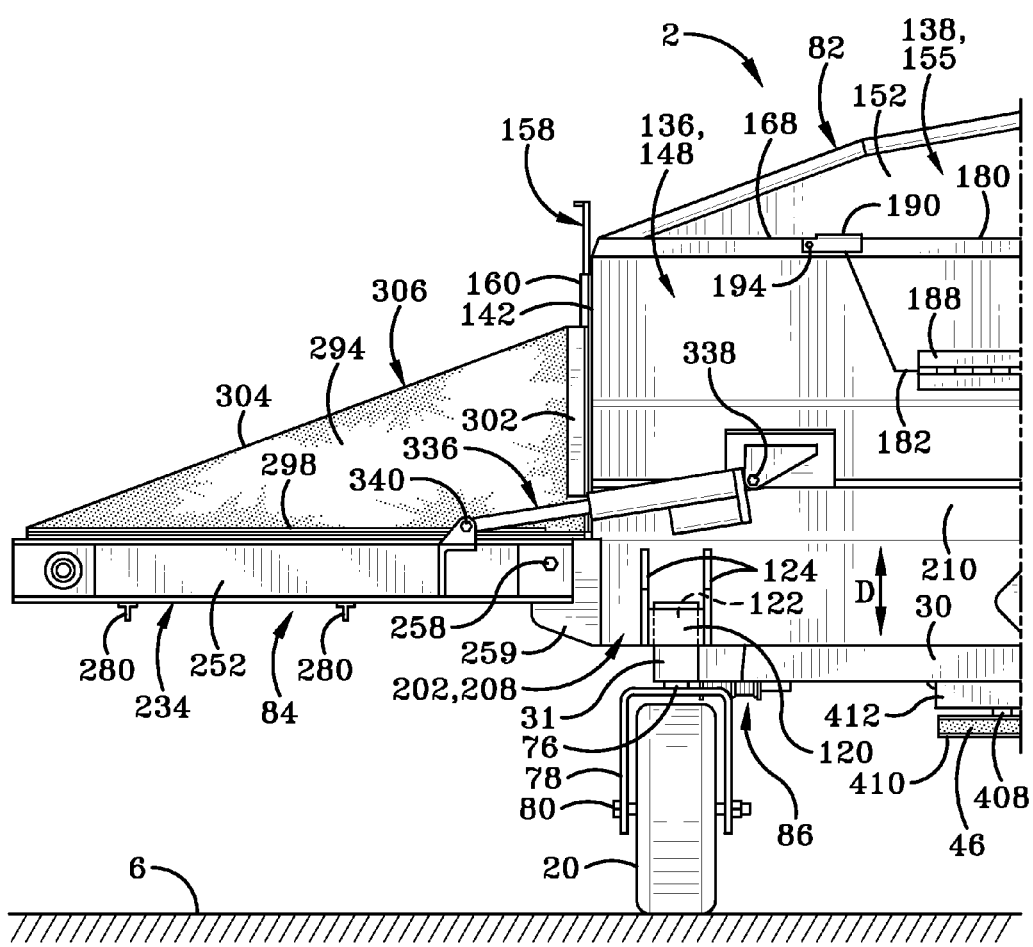
FIG. 7 is a front elevational view of a portion of the unit showing an alternate front mounting mechanism.
Figure 8:
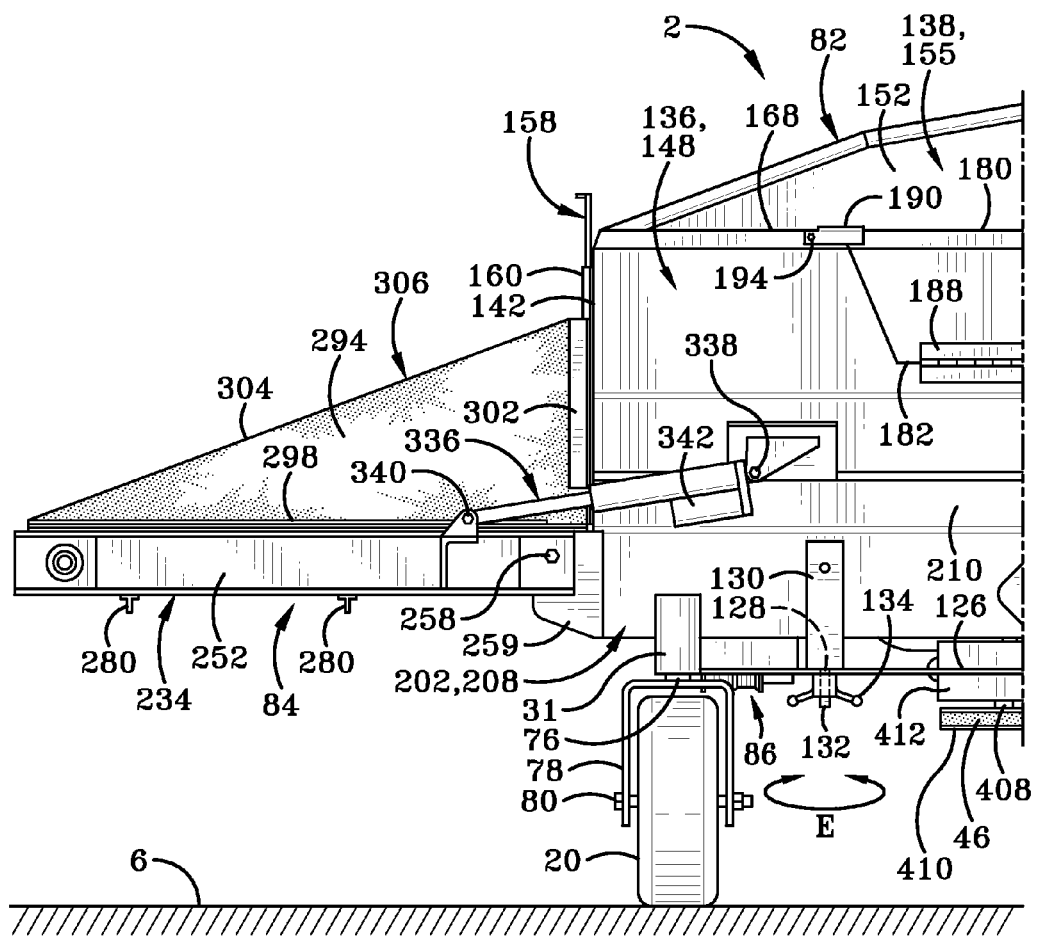
FIG. 8 is similar to FIG. 7 and shows another alternate front mounting mechanism.

In accordance with the invention, assembly 2 is mounted on frame 16, and in the exemplary embodiment is removably mounted thereon. The front mounting mechanisms 88 are particularly configured for mounting assembly 2 on the frame of a particular manufacturer's unit when the mower deck 4 is removed therefrom. FIGS. 7 and 8 illustrate two alternate front mounting mechanisms which are respectively configured for two other specific configurations of different manufacturers or models of the unit. More particularly, FIG. 7 illustrates an alternate front mounting mechanism which includes a mounting member in the form of a rigid typically metal cylindrical sleeve 120 defining a vertical cylindrical passage or hole 122 wherein sleeve 120 is secured to hopper 82 adjacent the bottom thereof between a pair of rigid metal vertical mounting plates 124 of a mounting bracket whereby sleeve 120 is rigidly secured to hopper 82. In the mounted or attached position of assembly 2, caster mount sleeve 31 is received within passage 122 of hopper mount sleeve 120. Arrow D in FIG. 7 shows the upward and downward movement of assembly 2 including sleeve 122 such that vertical upward movement thereof causes sleeve 120 to slide off of sleeve 31 to dismount assembly 2 and downward vertical movement causes sleeve 120 to slide downwardly over sleeve 31 to slidably receive sleeve 31 within hole 122 of sleeve 120. As shown in FIG. 7, the rear mounting mechanism 86 is the same.

FIG. 8 illustrates that the frame of the unit includes a rigid front horizontal metal plate 126 which is generally adjacent and extends between front wheels 120. A manufacturer's through hole 128 is formed in plate 126 extending from its top to its bottom. For the present purposes, a manufacturer's hole is defined herein as being a hole formed by the original manufacturer wherein the hole may have been used for purposes of manufacturing or assembling the unit, but is not used in the final product. Thus, no portion of the original manufacturer's unit extends through hole 128. Where applicant's assembly 2 is a retrofit attachment, the configuration in FIG. 8 is intended to utilize the manufacturer's hole 128 and thereby once again avoid voiding the manufacturer's warranty by drilling additional holes or otherwise damaging the original unit. The alternate front mounting mechanism shown in FIG. 8 includes a rigid mounting bracket 130 which is rigidly secured to the lower portion of hopper 82 and extends downwardly therefrom to a bottom end from which an externally threaded rod or shaft 132 extends downwardly. Shaft 132 is inserted downwardly through hole 128 with the bottom of bracket 130 seated atop plate 126 and with an internally threaded member in the form of a wing nut 134 threaded onto shaft 132 to abut the bottom of plate 126, thereby securing assembly 2 on the frame and prevent its upward movement therefrom. Preferably, wing nut 134 includes relatively large wings which may be manually engaged for easy rotation of the wing nut (Arrow E) to tighten and loosen the nut on shaft 132 without the use of tools. Again, the configuration of FIG. 8 retains the rear mounting mechanism 86. Advantageously, the use of rear mounting mechanism 86 with any of the front mounting mechanisms discussed above allows attachment 2 to be rapidly attached to or removed from frame 16. Hopper 82 is now described with primary reference to FIGS. 1-3, 6 and 9-11.

Hopper 82 includes front and back side walls 136 and 138, and left and right side walls 140 and 142 defining therewithin an interior chamber 144 having a top entrance opening 146. Front side wall 136 includes an upper vertical segment 148 and an angled lower segment 150 which is secured to and angles rearwardly and downwardly from the bottom of vertical segment 148. Back side wall 138 includes a vertical upper segment 152 and an angled lower segment 154 which is secured to and angles downwardly and forward from the bottom of vertical upper segment 152. Left side wall 140 is substantially vertical and is secured to and extends between the left ends of front and back side walls 136 and 138. Right side wall 142 is also substantially vertical and is secured to and extends between the right ends of front and back side walls 136 and 138. Vertical upper segment 152 includes a vertical extension 155 which extends upwardly beyond the tops of front side wall 136 and left and right side walls 140 and 142. Extension 155 thus adds additional height to help prevent mulch or particulate material being loaded into the interior chamber of hopper 82 from being thrown onto engine 22 and other components rearward of extension 155.

A rectangular exit opening 156 is formed in right side wall 142 to allow mulch or other particulate material to exit there through from within interior chamber 144. A flat vertical rectangular gate 158 is movably mounted on right side wall 142 in order to alter the size of exit opening 156 as desired. More particularly, side wall 142 includes a pair of vertical channels 160 which face one another and bound exit opening 156 so that the front and rear edges of gate 158 are slidably received within the front and rear channels 160 respectively such that gate 158 is manually vertically slidable up and down as indicated at Arrow F in FIG. 1. Channels 160, the bottom of gate 158 and the top of the conveyor belt of assembly 84 thus define therebetween exit opening 156, the size of which is thus adjustable by moving gate 158 upwardly or downwardly. A plurality of height adjustment holes 162 are formed in gate 158 and are vertically aligned and vertically spaced from one another. A securing mechanism including a rod 164 (FIGS. 10, 14, 16) is removably insertable into a selected one of holes 162 to secure gate 158 at the desired height. Rod 164 may be a threaded rod which threadedly engages holes 162 if they are internally threaded or may for instance be a spring biased rod which is biased to be inserted into holes 162.

With primary reference to FIG. 2, a front entrance opening 166 is formed in upper segment 148 of front side wall 136 and extends downwardly from a horizontal top 168 of side wall 136. Entrance opening 166 has a horizontal top 170 at the same height as top 168, a horizontal bottom 172, a left side 174 adjacent left side wall 140 and a right side 176 intermediate left and right side walls 140 and 142. A substantially flat door 178 is movably mounted on upper segment of hopper 82 and has a shape which is approximately the same as that of entrance opening 166. Door 178 has a horizontal top 180, a horizontal bottom 182, a left side 184 and a right side 186. Door 178 is mounted adjacent bottom 182 by a hinge 188 whereby door 178 is pivotally movable about a horizontal axially extending axis X2 between a closed position shown in FIG. 2 and an open position shown in dashed lines in FIG. 1. In the closed position, top 180 is substantially coincident with top 170, bottom 182 is substantially coincident with bottom 172, left side 184 is substantially coincident with left side 174 and right side 186 is substantially coincident with right side 176 whereby door 178 in the closed position entirely covers entrance opening 166. Top 168 of front side wall 136, top 170 of entrance opening 166 and top 180 of door 178 when door 178 is closed are all at a height H1. Bottom 172 of entrance opening 166 is at a height H2 which is lower than height H1 so that when door 178 is pivoted to flip to its open position (FIG. 1), door 178 hangs downwardly from hinge 188 so that bottom 182 of the door serves as the top of the door in the open position while top 180 serves as the bottom of the door. It is noted that entrance opening 166 opens upwardly at top 170 when door 178 is in the opened position whereby assembly 2 is free of structure extending along the top of opening 166 from its left side to its right side when door 178 is open. Thus, when door 178 is opened, entrance opening 166 provides access to the interior chamber at a height which is lower than height H1, thereby facilitating the loading of mulch or other particulate material into the hopper through entrance opening or doorway 166. When door 178 is closed, filling the hopper from the front must be achieved by moving the particulate material over top 168 or top 180 and thus above height H1 in order to enter interior chamber 144.

Figure 10:
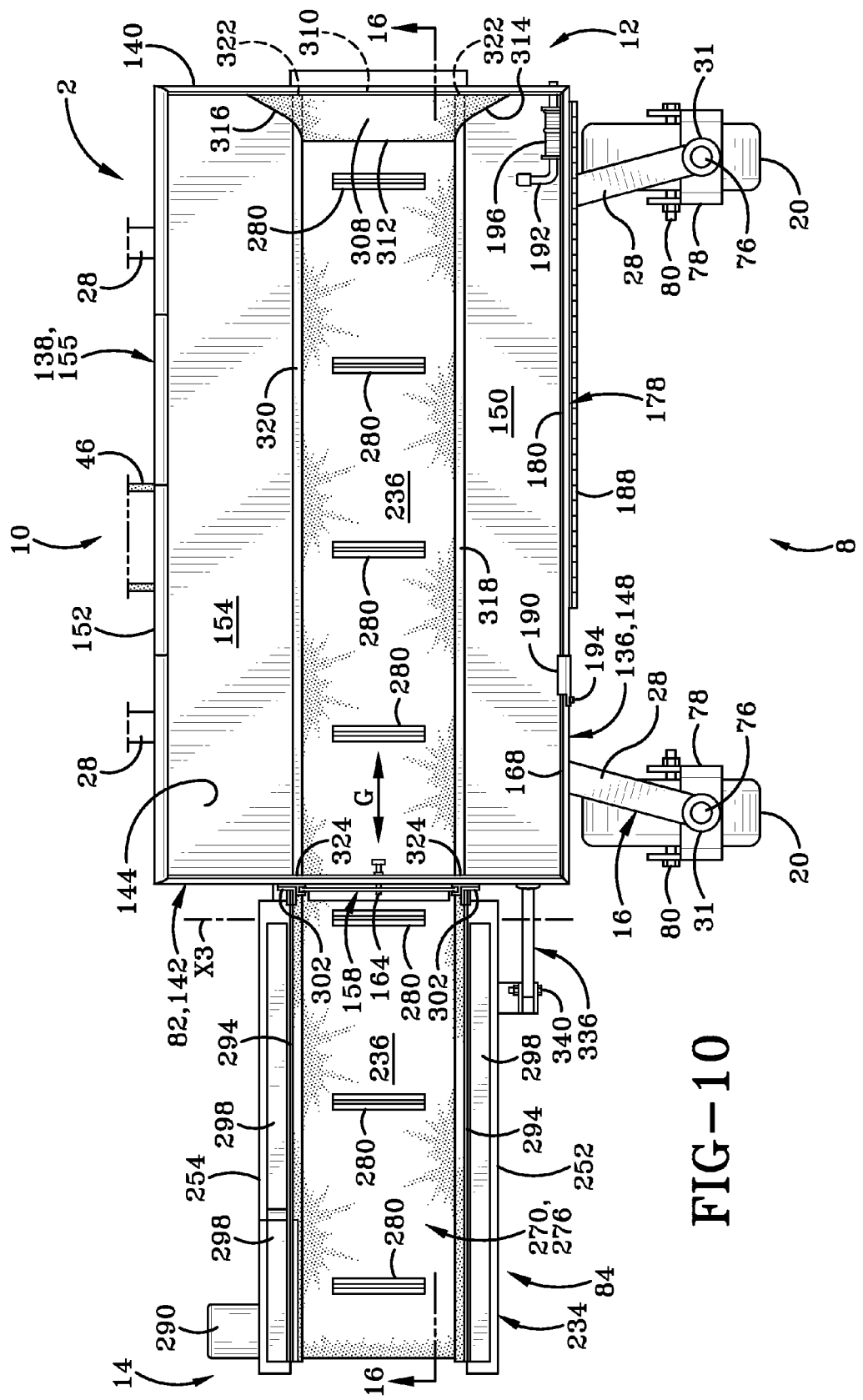
FIG. 10 is a top plan view of the portion of the unit shown in FIG. 9.

A securing mechanism is provided to secure door 178 in the closed position and includes a first latch 190 and second latch 192 (FIG. 10). First latch 190 is a channel-shaped member which receives a portion of door 178 along top 180 thereof. First latch 190 is pivotally mounted at pivot 194 on front side wall 136 adjacent top 168 and top 170 and side 176 of entrance opening 166. Second latch 192 is movably mounted on the inside of door 178 adjacent the left side 184 such that latch 192 is removably insertable into a hole (not shown) formed in left side wall 140 adjacent the top and front thereof. A coil spring 196 (FIG. 10) biases latch 192 to the secured position. The configuration of the securing mechanism provided by latch 192 is the same as or similar to rear mounting mechanism 86.

Figure 14:
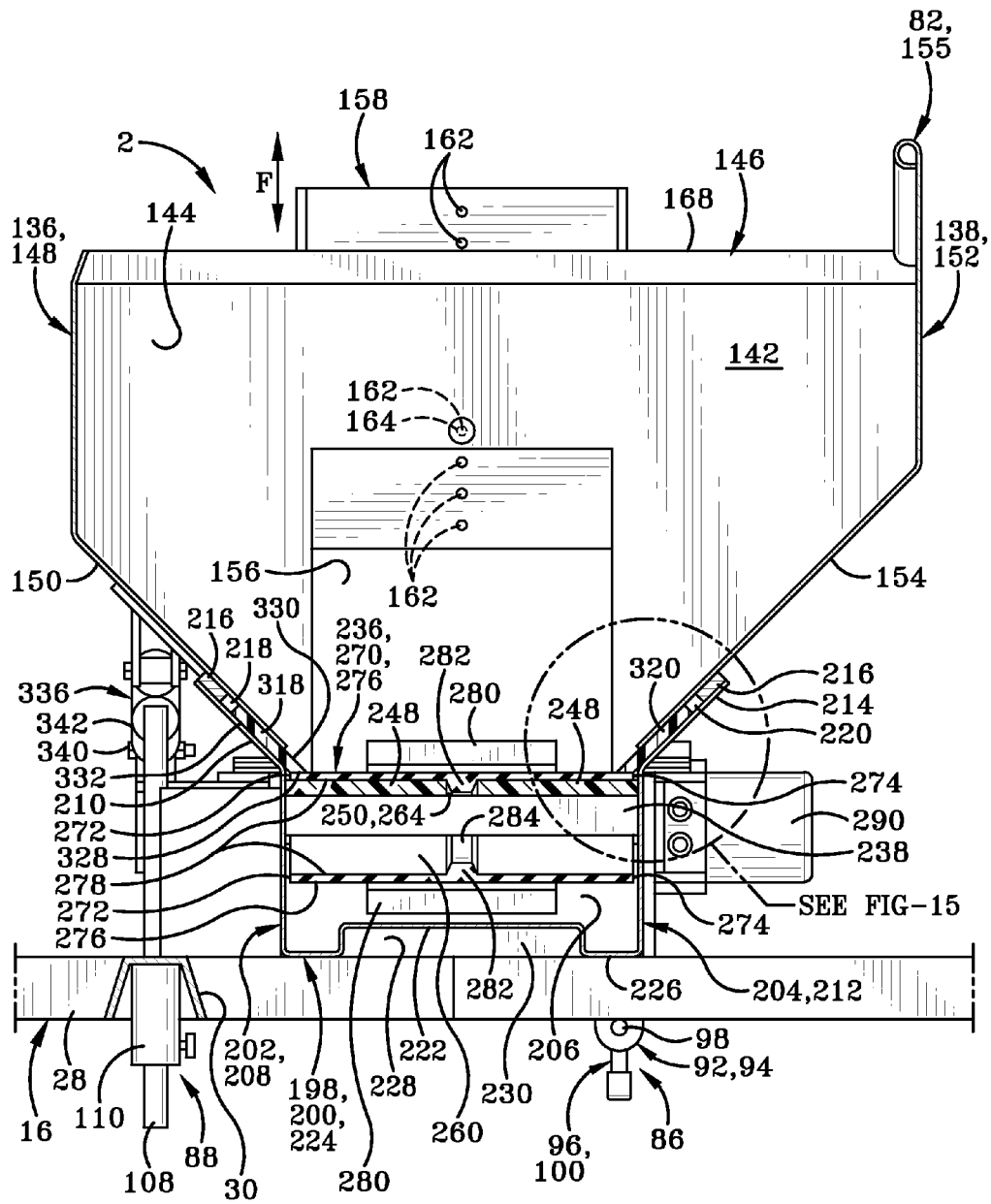
FIG. 14 is a sectional view taken on line 14-14 of FIG. 2.

Hopper 82 includes a conveyor assembly housing 198 which is secured to the lower portions of side walls 136, 138, 140 and 142 and extends downwardly therefrom. Referring primarily to FIG. 14, housing 198 in the exemplary embodiment is formed from the single sheet of metal which is then bent to provide a bottom wall 200, a front side wall 202 which is secured to and extends upwardly from the front of bottom wall 200, and a back side wall 204 which is secured to and extends upwardly from the rear end of bottom wall 200. Walls 200, 202 and 204 define there within an interior chamber 206 which opens upwardly to communicate with interior chamber 144 whereby chambers 144 and 206 form a single chamber.

Front side wall 202 includes a lower vertical segment 208 which is secured to the front end of bottom wall 200 and extends upwardly therefrom, and an angled upper segment 210 which is secured to the top of segment 208 and angles upwardly and forward therefrom parallel to angled segment 150 to an upper terminal end. Back side wall 204 also includes a lower vertical segment 212 secured to the back end of bottom wall 200 extending upwardly therefrom, and an angled upper segment 214 which angles upwardly and rearwardly parallel to angled segment 154 to an upper terminal end. Angled segment 210 adjacent its upper terminal end is secured to a spacer 216 which is secured to angled segment 150 in a position spaced upwardly of its lower terminal end so that angled segments 210 and 150 are spaced from one another to define therebetween a front channel 218. Similarly, angled segment 214 adjacent its upper terminal end is secured to another spacer 216 which is secured to angle segment 154 whereby angled segments 214 and 154 are spaced from one another to define there within a rear channel 220. Channels 218 and 220 will be discussed further below. Housing 198 is thus rigidly secured to front and back side walls 136 and 138 by spacers 216, which are typically welded to the angled segments or otherwise rigidly secured thereto and extend from left side wall 140 to right side wall 142. Angled segments 210 and 214 are also rigidly secured at their left ends to left side wall 140 and that their right ends to right side wall 142. Housing 198 thus extends from adjacent left side wall 140 to adjacent right side wall 142 whereby channels 218 and 220 likewise extend from adjacent side wall 140 to adjacent side wall 142.

Bottom wall 200 includes a recessed wall 222 which is spaced upwardly from the bottom of the housing with a front foot 224 extending downwardly from the front of wall 222 and a back foot 226 extending downwardly from the back of wall 222. Front foot 224 is secured to the bottom of vertical segment 208 while back foot 226 is secured to the bottom of segment 212. Feet 224 and 226 define the bottom of housing 198 and the bottom of hopper 82, which is seated on the top upwardly facing surfaces of rails 28. Several longitudinal parallel strengthening ribs 230 are disposed within recess 228 and axially spaced from one another, as best seen in FIG. 11. Each rib 230 typically has a tubular form and is rigidly secured to recessed wall 222 and feet 224 and 226. In the exemplary embodiment, when assembly 2 is mounted on frame 16, all or nearly all of hopper 82 is positioned directly above mower deck mounting space 66 (or mower deck 4 if also mounted on frame 16), including the various side walls of hopper 82, gate 158, door 178 and housing 198.

Figure 9:
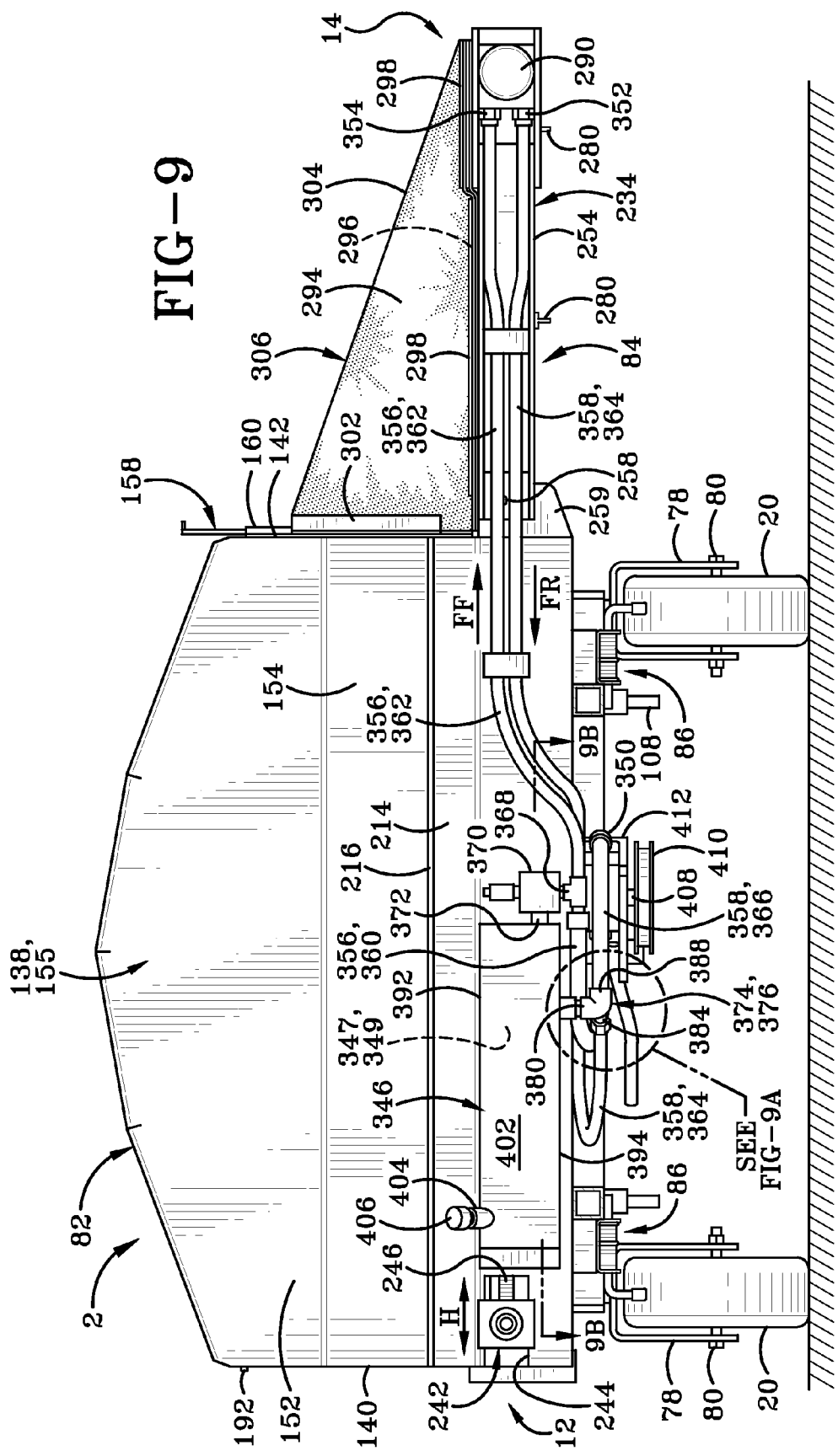
FIG. 9 is a sectional view looking forward and taken generally forward of the engine and rearward of the hopper to provide a rear elevational view of the hopper, conveyor assembly and front portion of the unit.
Figure 16:
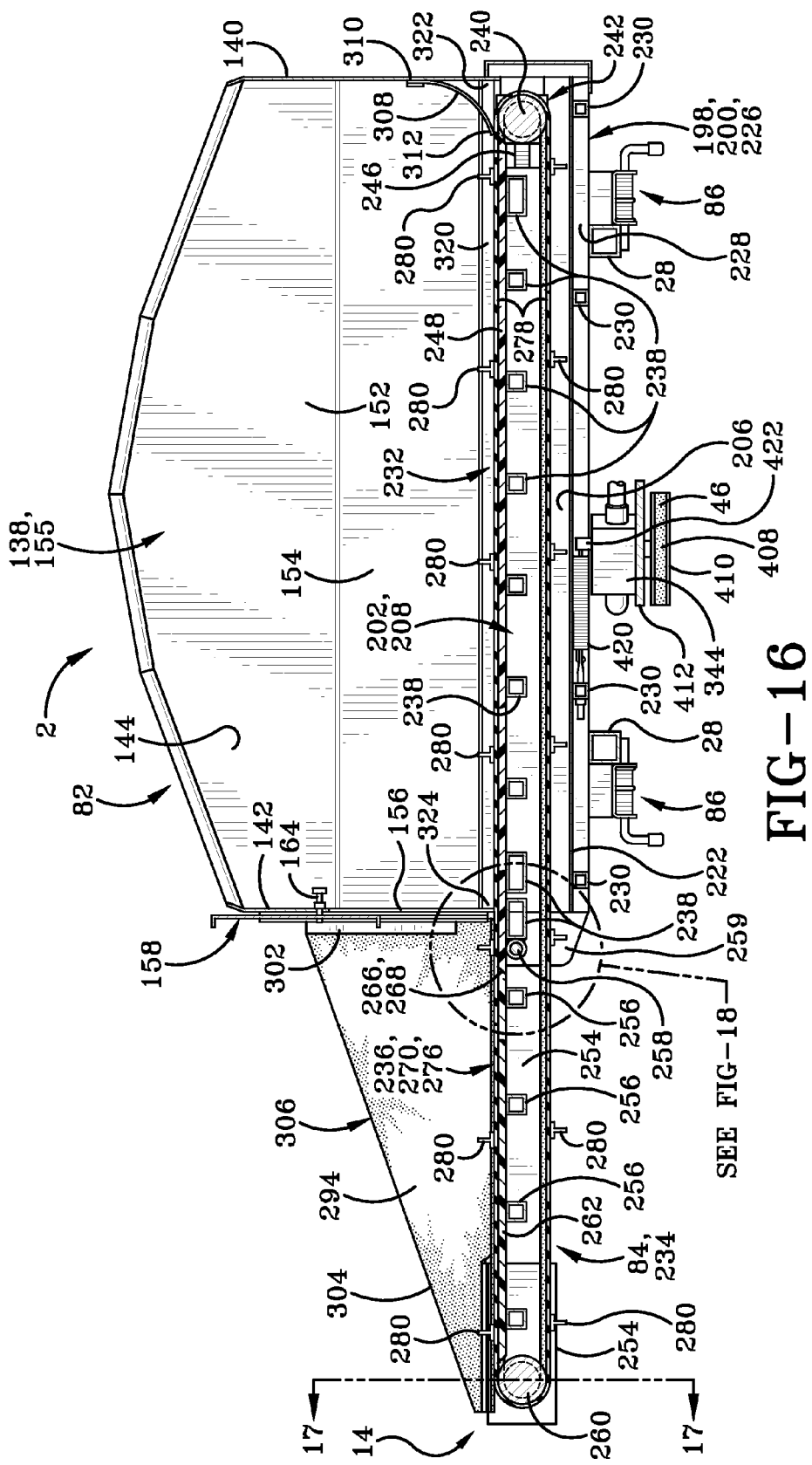
FIG. 16 is a sectional view taken on line 16-16 of FIG. 10.
Figure 17:
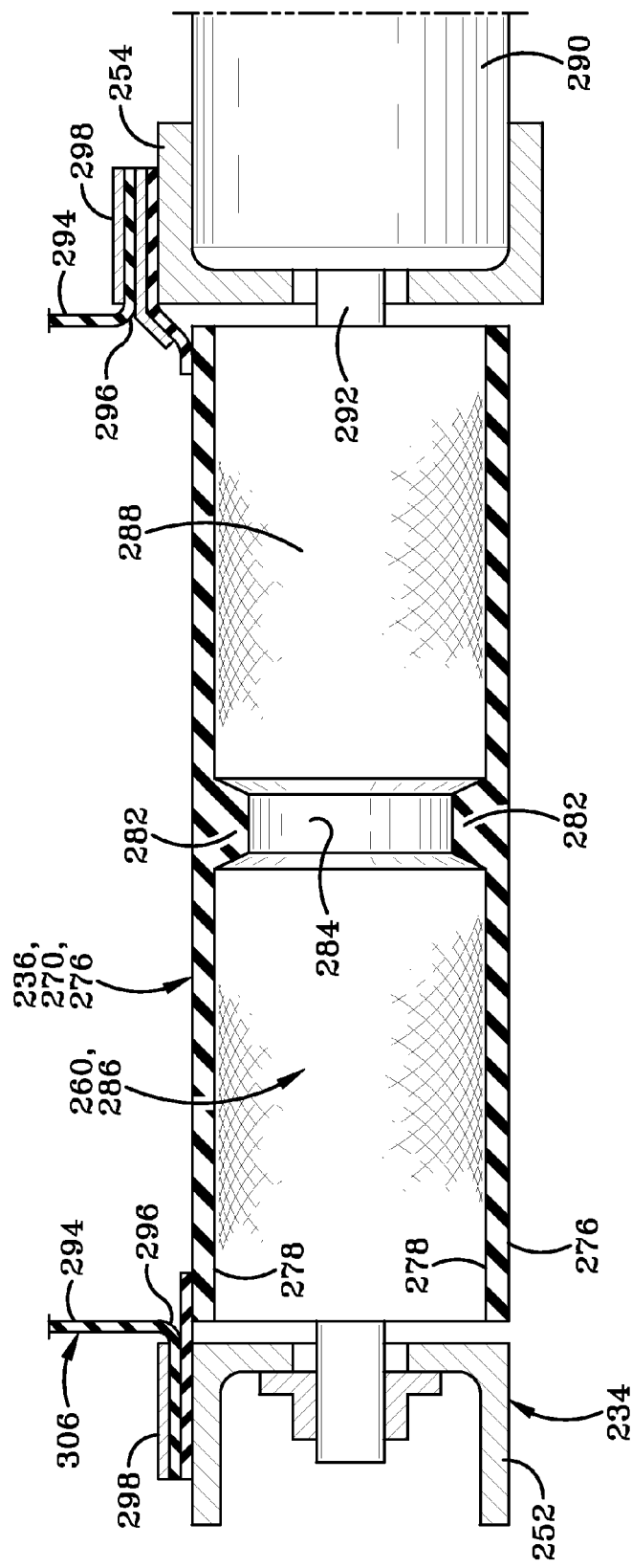
FIG. 17 is a sectional view taken on line 17-17 of FIG. 16.

Conveyor assembly 84 is now described in greater detail with primary reference to FIG. 16. Assembly 84 includes a conveyor belt support assembly which includes a first section 232 and a second or extension section 234. A flexible conveyor belt 236 is revolvably mounted on the conveyor assembly around sections 232 and 234. Section 232 includes a plurality of rigid parallel longitudinal support ribs 238 which are axially spaced from one another within interior chamber 206 of housing 198. Ribs 238 extend between and are rigidly secured to the upper portion of vertical segments 208 and 212 of housing 198. Ribs 238 thus substantially strengthen housing 198 and provide support for belt 236. First section 232 further includes a rotatable idler roller 240 spaced to the left of ribs 238. Roller 240 is disposed in chamber 206 and is rotatably mounted on a roller carriage 242 having front and rear plates which are slidably received within carriage openings 244 formed respectively in vertical segment 208 of front wall 202 (FIG. 2) and vertical segment 212 of back side wall 204 adjacent left side wall 140 (FIGS. 9, 16). More particularly, carriage 242 is horizontally slidable back and forth to the right and to the left as indicated at Arrow H in FIGS. 2 and 9. Front and rear springs 246 are provided respectively along openings 244 with their outer ends engaging the front and rear portions of carriage 242 respectively and their inner ends engaging housing 198 of hopper 82 or another fixed structure such as one of ribs 238 of first section 232. Springs 246 thus bias carriage 242 and roller 240 axially in a direction away from the opposite end of the conveyor belt support structure and opposite end of the conveyor belt. In this case, springs 246 bias carriage 242 and roller 240 to the left away from ribs 238.

First section 232 further includes axially elongated front and rear conveyor belt support planks 248 which are seated atop ribs 238 and on which conveyor belt 236 is supported. Planks 248 are typically formed of a plastic material which reduces friction between conveyor belt 236 and planks 248 during the sliding engagement therebetween when belt 236 is revolved. Each flat horizontal plank 248 has a left end which is adjacent carriage 242 and roller 240 and extends therefrom to an opposed right end which is adjacent and outward to the right of right side wall 142 of hopper 82. Thus, the right portion of each plank 48 extends outwardly beyond interior chambers 144 and 206. Planks 248 are longitudinally spaced from one another a short distance to define therebetween an axially elongated straight slot 250 extending from the left end to the right end of planks 248.

The second or extension section 234 is now described in greater detail with continued reference to FIG. 16 and additional reference to FIGS. 2 and 9-12. Section 234 includes front and back parallel axial beams 252 and 254, and several longitudinal support ribs 256 which are axially spaced from one another. Ribs 256 extend between and are rigidly secured to beams 252 and 254, thereby providing a rigid structure which is pivotally mounted on first section 232 to pivot about a longitudinal horizontal axis X3 (FIG. 10) passing through a pivot 258. Pivot 258 and axis X3 are thus adjacent and to the right of side wall 142 external to interior chambers 144 and 206. Pivot 258 is also adjacent the right end of first section 232 opposite the end from which roller 240 is mounted, and adjacent the inner or left end of second section 234 opposite the outer end thereof adjacent which another roller 260 is rotatably mounted on beams 252 and 254. Rollers 240 and 260 rotate about respective horizontal parallel longitudinally extending axes parallel to axis X3 (FIG. 10). Pivot 258 is mounted on pivot mounts 259 (FIG. 11) which are secured to and extend outwardly from vertical segments 208 and 212 of housing 198.

Figure 18:
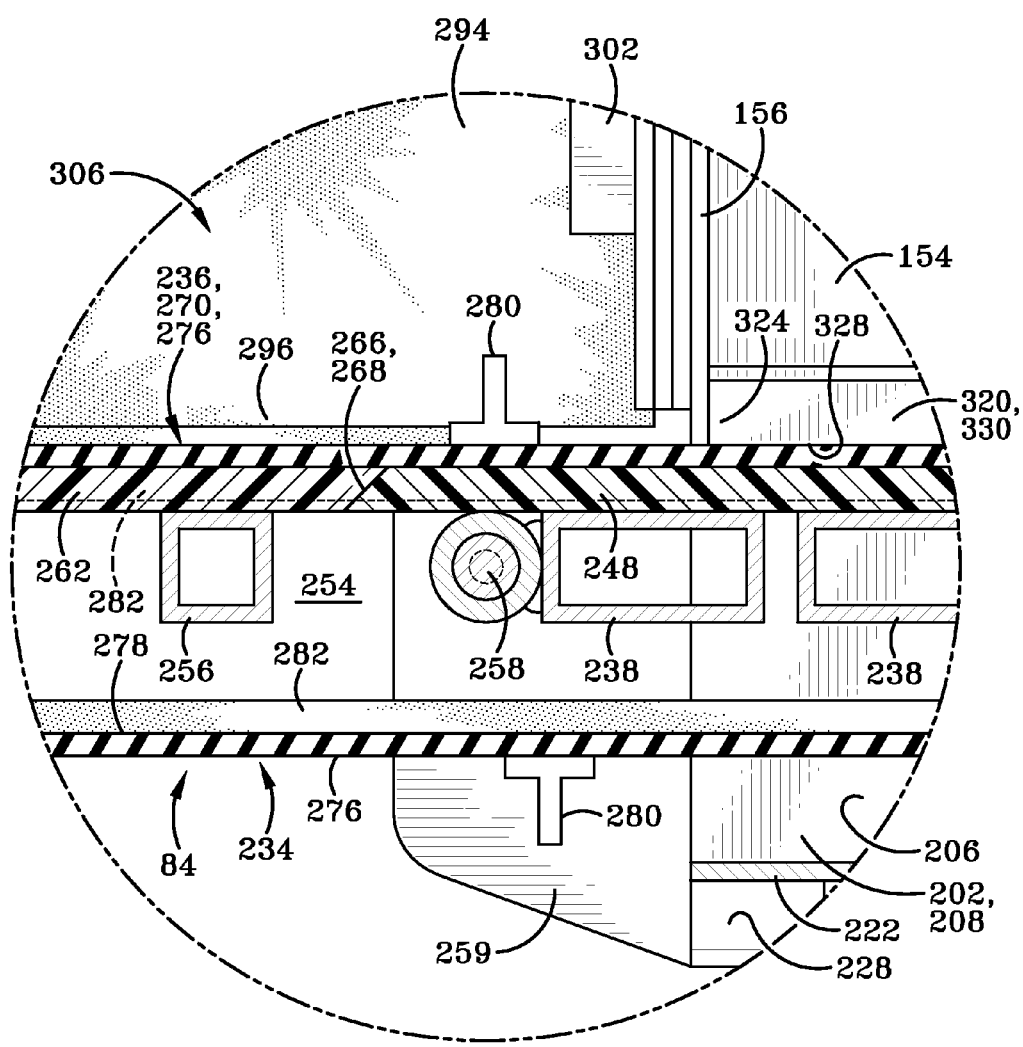
FIG. 18 is an enlarged sectional view of the encircled portion of FIG. 16.

Second section 234 further includes a pair of flat horizontal axially elongated support planks 262 which are typically formed of the same material as and arranged in the same manner as planks 248 of first section 232 such that planks 262 are seated atop support ribs 256 and have top surfaces which the bottom of the conveyor belt slidably engages during operation. The front and rear support planks 262 are aligned with the front and rear planks 248 as viewed from the right or left side whereby the straight front planks 248 and 262 together form a flat horizontal axially elongated straight support extending from adjacent driven roller 240 to adjacent drive roller 260. Similarly, the straight rear planks 248 and 262 form a flat horizontal axially elongated straight support from adjacent roller 240 to adjacent roller 260. Support planks 262 are longitudinally spaced from one another a short distance in the same manner as planks 248 to define therebetween a straight axially elongated slot 264 (FIG. 14) which is aligned with slot 250 whereby slots 250 and 264 form a single straight slot extending in the axial direction from adjacent roller 240 to adjacent roller 260. As best seen in FIG. 18, each plank 262 has an inner beveled end 266 and each plank 248 has an outer beveled end 268 disposed outwardly of interior chambers 144 and 206 external to and to the right of right side wall 142. In the extended operational position of extension section 234 and conveyor assembly 84 shown in FIGS. 16 and 18, beveled edges 266 and 268 are positioned adjacent and outwardly beyond pivot 258. In this position, beveled ends 266 and 268 abut one another and have a mating configuration. In this position, beveled edges 266 and 268 angle axially outwardly and downwardly away from the hopper from their respective top surfaces to their respective bottom surfaces.

Conveyor belt 236 is now described in greater detail with primary reference to FIGS. 14 and 16. Belt 236 includes a flat sheet 270 which is the primary component of the belt and which has front and back parallel edges 272 and 274 extending in the axial direction from adjacent roller 240 to roller 260. Sheet 270 has an outer surface 276 and an inner surface 278. The upper portion of sheet 270 which extends from the top of roller 240 to the top of roller 260 is substantially flat such that outer surface 276 thereof serves as its top surface which is substantially horizontal and faces upwardly in the extended position of the conveyor assembly. The inner surface 278 of this upper portion of belt 236 serves as its bottom downwardly facing surface which is seated atop planks 248 and 262 and slidably engages the same during the revolving movement of the belt. The lower portion of sheet 270 which extends from the bottom of roller 240 to the bottom of roller 260 is also substantially horizontal whereby the inner surface 278 thereof serves its top upwardly facing surface and the outer surface 276 thereof serves as its bottom downwardly facing surface. Belt 236 further includes longitudinally elongated blades 280 which are secured to outer surface 276 and extend outwardly therefrom whereby blades 280 extend upwardly from the upper section of sheet 270 and downwardly from the lower section of sheet 270. Blades 280 do not extend all the way across sheet 270, but rather have opposed ends which are adjacent and spaced longitudinally inwardly respectively from front and back edges 272 and 274. The upper terminal edges of blades 80 are substantially horizontal.

Belt 236 further includes a tongue 282 which is secured to inner surface 278 and extends outwardly therefrom in the direction opposite blades 280 midway between front and back edges 272 to 274. Tongue 282 extends axially all the way around the belt and is configured for a mating engagement within a groove 284 formed in each of rollers 240 and 260. Groove 284 thus divides each of rollers 240 and 260 into first and second cylindrical segments 286 and 288 having the same diameter with groove 284 therebetween. The use of tongue 282 within grooves 284 of the rollers thus eliminates or substantially minimizes the longitudinal movement of conveyor belt 236 during its revolving movement. It is noted that the conveyor belt may be formed with a groove while the rollers are formed with a tongue which is inserted in the groove of the belt to provide a similar effect. Inner surface 278 of sheet 270 engages the cylindrical outer surfaces of segments 286 and 288 of each roller 240 and 260. The outer surfaces of segments 286 and 288 of roller 260 are typically knurled or otherwise roughened to increase the frictional engagement with the inner surface 278 inasmuch as roller 260 is the drive roller of the assembly, whereas roller 240 is a driven roller driven by belt 236. A hydraulic motor 290 is secured to rear axial beam 254 adjacent its outer end and has a rotatable drive shaft 292 rotationally connected to drive roller 260 in order to drive rotation of roller 260. Motor 290 is thus carried by section 234 and is part of a hydraulic system described in greater detail further below.

With primary reference now to FIGS. 2 and 10, front and rear chute walls 294 are mounted on and extend between side wall 142 and respective axial beams 252 and 254 of extension section 234. More particularly, chute walls 294 are, in the extended position of extension 234, substantially flat, vertical and lie substantially within respective vertical parallel planes which extend in the axial direction. In the extended position, chute walls 294 are thus parallel and respectively forward and rearward of and adjacent exit opening 156. Chute walls 294 have bottom edges 296 which are respectively secured to beams 252 and 254 by respective mounting brackets 298. Chute walls 294 also have respective inner edges 300 which are secured to side wall 142 by respective mounting brackets 302. Each chute wall 294 has an angled upper edge 304 which angles axially outwardly and downwardly from the inner end to the outer end of chute wall 294 and thus from adjacent side wall 142 and the top of bracket 302 to adjacent the outer end of the respective beam 252 or 254 and the outer end of the respective mounting bracket 298. Chute walls 294 are triangular as viewed in the longitudinal direction in the extended position. The upper section of conveyor belt 236 of extension 234 and chute walls 294 together form a chute 306 which extends axially outwardly away from side wall 142 and exit opening 156 whereby chute 306 is configured for carrying mulch or other particulate material axially outwardly away from exit opening 156 and interior chamber 144. Each chute wall 294 in the exemplary embodiment is formed of a flexible material, typically rubber or another elastomer.

Referring now to FIGS. 10 and 16, a flexible flap 308 is provided within interior chamber 144 adjacent its left end and thus opposite from exit opening 156. Flap 308 has an upper edge 310 which is secured to left side wall 140 such that flap 308 hangs downwardly therefrom to a terminal lower edge 312 which is seated atop conveyor belt 236 adjacent and above roller 240. As shown in FIG. 10, flap 308 has front and rear edges 314 and 316 which respectively angle upwardly and outwardly from lower edge 312 to upper edge 310 and are respectively closely adjacent or abut angle segments 150 and 154 of hopper 82. Flap 308 is typically formed of a rubber or other elastomer. Flap 308 adjacent lower end 312 slidably engages conveyor belt 236 during operation.

Referring now to FIGS. 10 and 14-16, front and rear axially elongated sealing strips 318 and 320 are respectively disposed within front and rear channels 218 and 220. Strips 318 and 320 are typically substantially rigid and formed of a plastic material which is similar to or the same as that of planks 248 and 262. In one embodiment, this material is high density polyethylene (HDPE) although other suitable plastic or other materials may be used. Each of the sealing strips has a left end 322 adjacent left side wall 140 and adjacent the left ends of the respective channels 218 and 220. The strips also have respective right ends 324 adjacent right side wall 142 and the rights ends of the respective channels 218 and 220. Each strip 318 and 320 has top and bottom edges 326 and 328 which are substantially horizontal as viewed in the longitudinal direction and extend from left end 322 to right end 324. Each of the strips has an inner surface 330 and an outer surface 332. Inner surfaces 330 face upwardly and bound interior chamber 144 while outer surfaces 332 face generally downwardly away from interior chamber 144. Each of strips 318 and 320 is substantially flat and positioned at an angle whereby inner and outer surfaces 330 and 332 are angled relative to horizontal.

Figure 15:
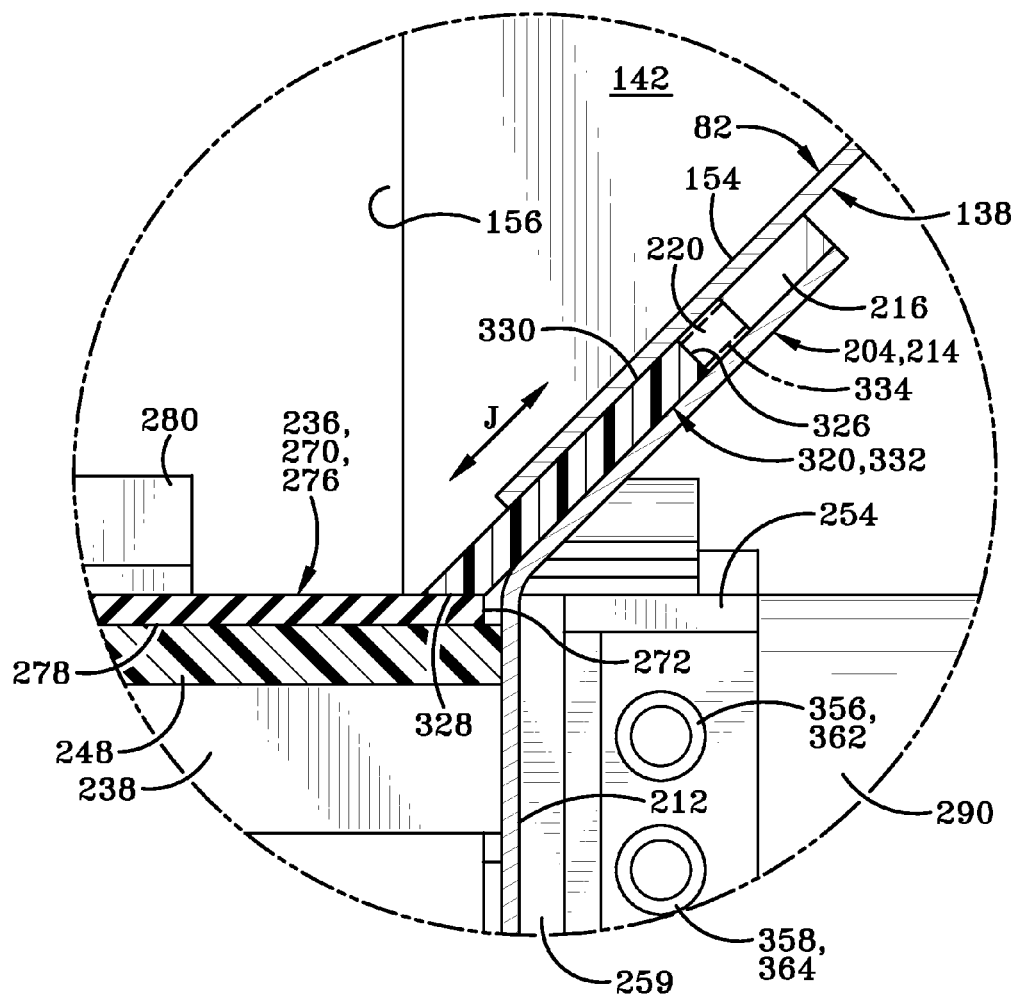
FIG. 15 is an enlarged sectional view of the encircled portion of FIG. 14.

As viewed in the axial direction and as best shown in FIG. 15, rear strip 320 is angled upwardly and rearwardly whereby parallel inner and outer surfaces 330 and 332 likewise angle upwardly and rearwardly whereby surface 330 faces upwardly and forward and surface 332 faces downwardly and rearward. Rear strip 320 is slidably mounted within channel 220 generally upwardly and downwardly (Arrow J) at an angle parallel to surfaces 330, 332 and to angled segments 154 and 214. Surface 330 thus slidably engages segment 154 and surface 332 slidably engages segment 214 during the sliding movement of strip 320. Typically, strip 320 is angled upwardly at about a 45-degree angle and bottom edge 328 is also beveled at about a 45-degree angle such that bottom edge 328 is substantially horizontal and seated atop the upper surface 276 of sheet 270 of belt 236 whereby there is a sliding engagement between bottom edge 328 and surface 276 adjacent back edge 274 during revolving movement of belt 236. Springs 334 such as coil springs may be positioned within channel 220 with an upper end of the spring engaging the lower edge of spacer 26 and the lower end of the spring engaging the top edge 326 of member 320, thereby biasing strip 320 downwardly toward and against belt 236. Otherwise, strips move downwardly along their respective angles under force of gravity.

Front sealing strip 318 is substantially a mirror image of rear strip 320 and operates in the same manner although strip 318 is angled in the opposite direction from strip 320. Thus, inner and outer surfaces 330 and 332 of strip 318 angle upwardly and forward so that surface 330 faces upwardly and rearward and bounds chamber 144 while surface 332 thereof faces downwardly and forward away from chamber 144. Surfaces 330 and 332 of front seal 318 respectively slidably engage angled segments 150 and 210. Beveled bottom edge 328 of front strip 318 slidably engages surface 276 of belt 236 adjacent front edge 272. Sealing strips 318 and 320 thus provide a sealing engagement with surface 276 of conveyor belt 236. This sealing engagement thus substantially eliminates or minimizes the degree of leakage of particles from particulate material within the interior chamber of hopper 82 from moving from within the hopper between belts 236 and strips 318 and 320 such that such debris or particles would move outwardly beyond the edges 272 and 274 of conveyor belt 236, thereby preventing or minimizing such debris or particles from entering chamber 206 of housing 198 and contacting the various components below the upper horizontal section of conveyor belt 236, such as planks 248 and 262 pivot 258, rollers 240 and 260 and the corresponding axles and bearings associated therewith.

Figure 21:
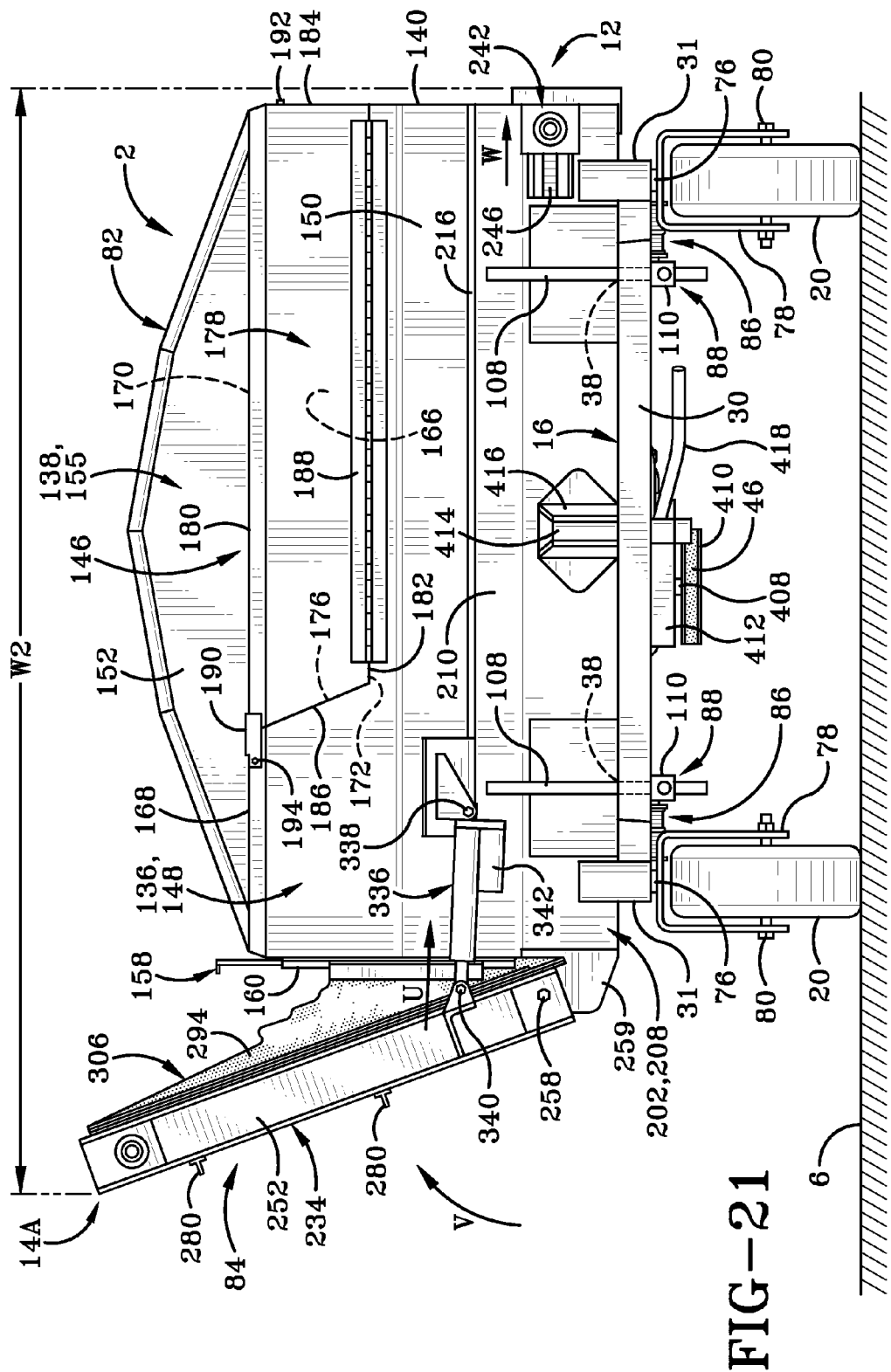
FIG. 21 is a front elevational view of the unit showing the extension portion of the conveyor belt assembly having moved from the extended operational position of FIG. 20 to the retracted stored position.

Referring primarily to FIG. 2, a linear actuator 336 is provided for moving the extension portion of conveyor belt assembly 84 between an extended position shown in FIG. 2 and a retracted position shown in FIG. 21. In the exemplary embodiment, actuator 336 is a piston-cylinder combination wherein the cylinder is pivotally mounted at a pivot 338 on hopper 82 via a mounting bracket secured to the hopper. The piston of actuator 336 is pivotally mounted at pivot 340 to the extension section of assembly 84 via a mounting bracket secured to axial beam 252. An electric motor 342 is mounted on the cylinder for powering the actuation of actuator 336, more particularly to extend and retract the piston thereof to facilitate pivotal movement of the extension of assembly 84. Electric motor 342 is in electrical communication with switch 72 and a battery of engine 22, which provides electric power for operation of motor 342.

Figure 9A:
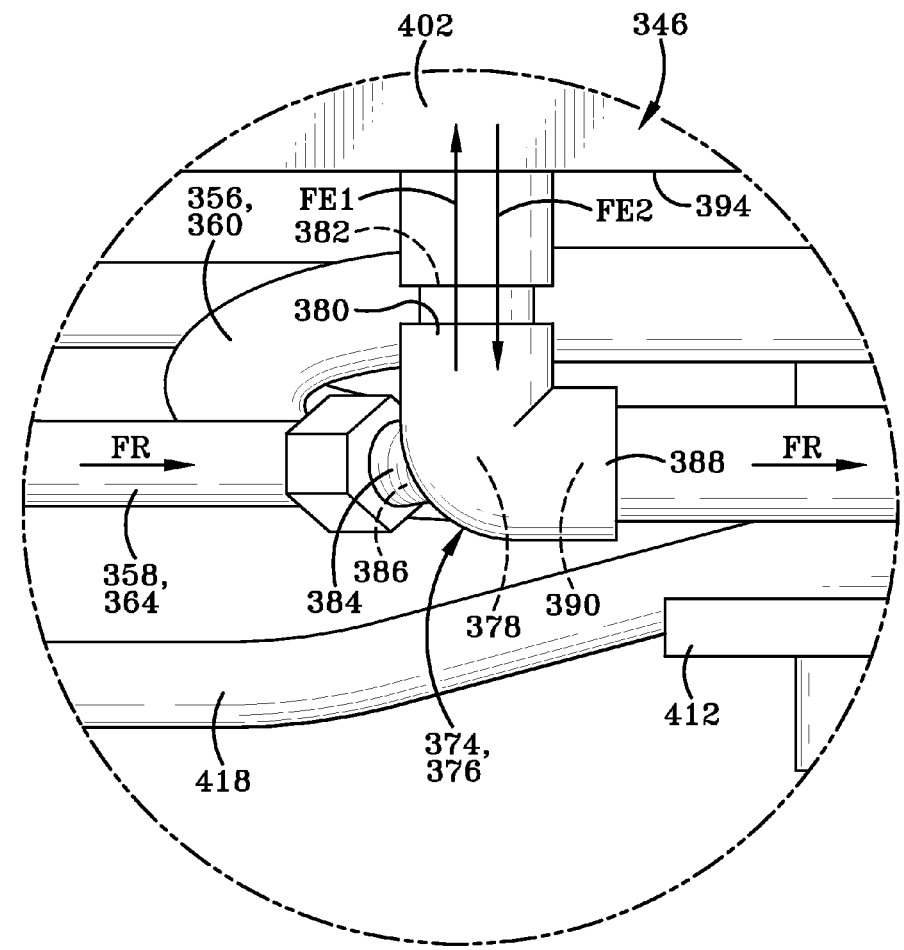
FIG. 9A is an enlarged rear elevational view of the encircled portion of FIG. 9.
Figure 13:
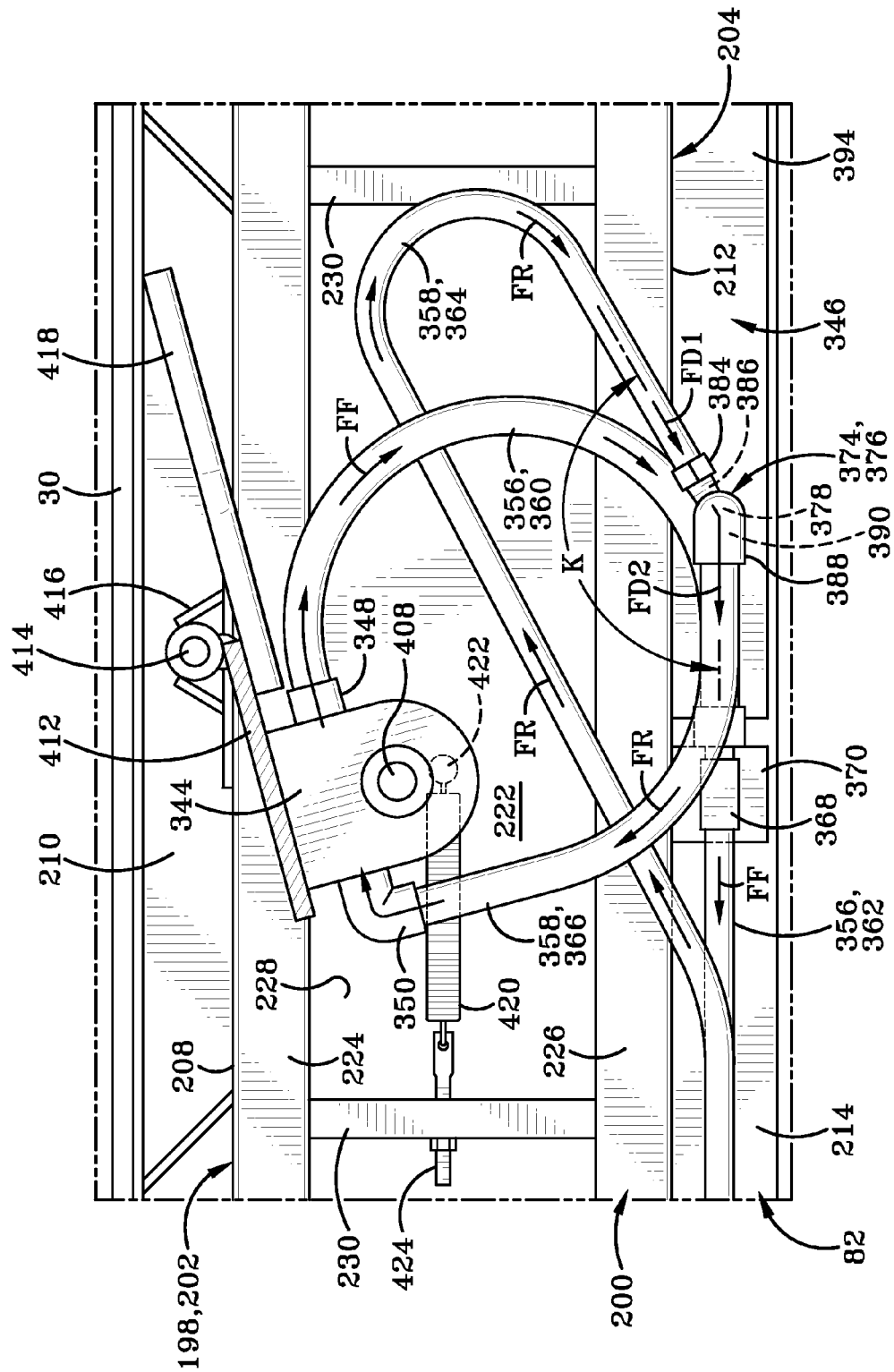
FIG. 13 is an enlarged sectional view showing the hydraulic pump in the same position as FIG. 11 without the sheave and drive belt.

With primary reference to FIGS. 9, 9A and 13, the hydraulic system of attachment 2 is now described. As previously noted, the hydraulic system includes the hydraulic motor 290. The hydraulic system is self-contained and in the exemplary embodiment is mounted entirely on attachment 2 whereby the hydraulic system is removable from the frame 16 with attachment 2. The hydraulic system also includes a hydraulic pump 344 (FIG. 13) which is mounted below the bottom of housing 198 of hopper 82. The hydraulic system further includes a hydraulic tank or reservoir 346 rigidly mounted on housing 198 of hopper 82. Reservoir 346 defines an interior chamber 347 for containing hydraulic fluid 349 which is pumped throughout the system. Pump 344 has a pump outlet 348 and a pump inlet 350. Hydraulic motor 290 has a motor outlet 352 and a motor inlet 354. A hydraulic feed line 356 is connected at its upstream end to pump outlet 348 and at its downstream end to motor inlet 354. A return line 358 is connected at its upstream end to motor outlet 352 and at its downstream end to pump inlet 350. Feed line 356 includes a first or upstream segment 360 and a second or downstream segment 362. Return line 358 includes a first or upstream segment 364 and a second or downstream segment 366. The hydraulic system further includes a T-connector 368, a relief valve 370, a conduit 372 and an exchange connector 374. Exchange connector 374 includes a convergence chamber wall 376 which defines a convergence chamber 378, an exchange leg 380 which defines an exchange passage 382, an input leg 384 which defines an input passage 386 and an output leg 388 which defines an output passage 390. First segment 360 at its upstream end is connected to outlet 348 and at its downstream end to an inlet of T-connector 368. Downstream segment 362 is connected at its upstream end to an outlet of T-connector 368 and at its downstream end to motor inlet 354. First segment 364 at its upstream end is connected to motor outlet 352 and at its downstream end to input leg 384 of connector 374. Second segment 366 at its upstream end is connected to output leg 388 of connector 374 and at its downstream end to inlet 350 of pump 344. In the exemplary embodiment, segments 360, 362, 364 and 366 are flexible hoses while T-connector 368 and exchange connector 374 are typically rigid structures which are usually formed of metal. T-connector 368 includes an outlet which is connected to and in fluid communication with relief valve 370. Conduit 372 extends between and is connected to relief valve 370 and hydraulic tank 346 to provide fluid communication therebetween. Relief valve 370 is configured to release hydraulic fluid in the case of an overpressure situation within the hydraulic system whereby hydraulic fluid typically does not flow between connector 368 and reservoir 346 via valve 370 under normal operating circumstances.

In typical hydraulic systems, the reservoir has an inlet and a separate outlet such that under normal operations, hydraulic fluid is pumped into the reservoir via the inlet and out of the reservoir via the outlet. The hydraulic system of the present invention is configured to avoid this type of configuration and operation, and substantially minimizes the amount of hydraulic fluid needed within the system. To that effect, the present hydraulic system includes exchange connector 374. Connector 374 is positioned adjacent and below reservoir 346 such that exchange leg 380 is connected to and extends between chamber wall 376 and the bottom wall of reservoir 346 whereby exchange passage 382 provides fluid communication between convergence chamber 378 and interior chamber 347 of tank 346. Input leg 384 is connected to and extends upstream from chamber wall 376 such that input passage 386 is in fluid communication with and extends upstream from convergence chamber 378. Output leg 388 is connected to and extends downstream from chamber wall 376 such that output passage 390 is in fluid communication with and extends in the downstream direction from convergence chamber 378. In the exemplary embodiment, each of legs 384 and 388 extends perpendicular to exchange leg 380 whereby each of passages 386 and 390 also extend perpendicular to exchange passage 382. Input and output legs 384 and 388 define therebetween an obtuse fluid exchange angle K (FIG. 13) such that hydraulic fluid which enters the input leg from segment 364 is exchanged with hydraulic fluid in interior chamber 347 of the reservoir 346 via exchange passage 382. Angle K typically falls within the range of about 165 to 175 degrees, usually within the range of about 168 to 173 degrees, and in the exemplary embodiment is in the range of about 170 to 171 degrees.

As illustrated in FIGS. 9 and 13, the feed flow direction of the hydraulic fluid flow in the hydraulic feed lines from pump 344 to motor 290 is shown at Arrows FF whereas the return flow direction of hydraulic fluid flow in the return lines is illustrated at Arrows FR. FIG. 13 also shows at Arrow FD1 the fluid flow direction of hydraulic fluid within input passage 386 and immediately upstream thereof, and at Arrow FD2 the fluid flow direction of hydraulic fluid within output passage 390 and immediately downstream thereof. Fluid direction FD1 and FD2 also define therebetween obtuse angle K. It has been shown that the fluid flow associated with the fluid exchange angle K causes fluid exchange between chamber 347 of reservoir 346 and convergence chamber 378. More particularly, FIG. 9A illustrates such an exchange at Arrows FE1 and FE2, wherein Arrow FE1 indicates fluid flowing from chamber 378 into chamber 347 and Arrow FE2 illustrates fluid flowing from chamber 347 into chamber 378. Although this fluid exchange occurs, the predominant flow of hydraulic fluid nonetheless is directly through input passage 384, chamber 376 and output passage 390. Although the fluid dynamics have not been specifically investigated, it may be that the fluid flow due to angle K creates a vortex leading to the above-noted fluid exchange.

Figure 9B:
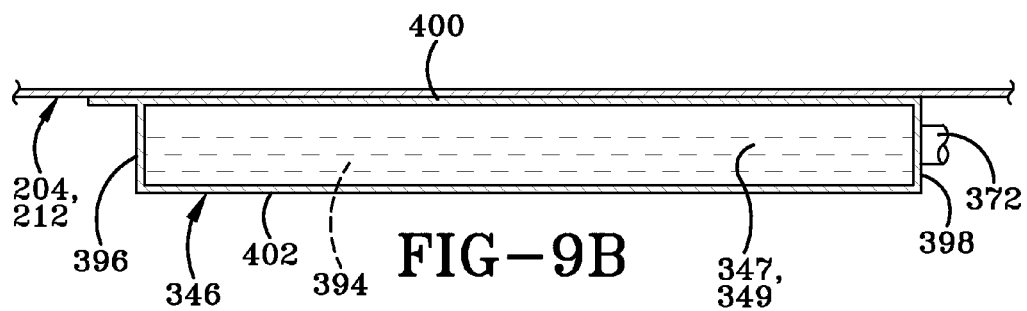
FIG. 9B is a sectional view taken on line 9B-9B of FIG. 9.

Referring now to FIGS. 9 and 9B, reservoir 346 is described in greater detail. Reservoir 346, all of which is directly above space 66 when assembly 2 is mounted on frame 16, includes a top wall 392, a bottom wall 394, a left end wall 396, a right end wall 398, a front wall 400 and a back wall 402. A fill tube 404 is mounted on the reservoir adjacent top wall 392 with a closure cap 406 provided which may be removed in order to fill the tank with hydraulic fluid and secured thereon in order to provide a seal between the interior chamber and external atmosphere in order to provide a closed hydraulic system. Each of the above-noted walls of reservoir 346 is typically substantially flat and made of metal. Preferably, the metal of which the walls are formed is aluminum or an alloy formed primarily of aluminum. As shown in FIG. 9B, front wall 400 abuts vertical segment 212 of back side wall 204 of housing 198. Preferably, the outer or front surface of wall 400 is in substantially continuous contact from top to bottom and from the left end to the right end with the outer or rear surface of vertical segment 212 in order to provide the greatest degree of contact between wall 400 of reservoir and segment 212 of hopper 82. Wall 400 and segment 212 are thereby in thermal communication with one another in order to provide substantial thermal exchange therebetween. Thus, when hydraulic fluid 349 is heated during its work when pumped through the hydraulic system by pump 344 through motor 290, hopper 82 serves as a heat sink such that heat from hydraulic fluid is transmitted through wall 400 to segment 212 so that this heat may be dissipated relatively rapidly through the various walls of hopper 82. Hopper 82 serves as a good heat sink in that wall 400 of reservoir 346 and the various walls of hopper 82 are formed of good thermal conductors. More particularly, like the walls of reservoir 346, the various walls of hopper 82 are formed of metal and preferably of aluminum or an aluminum alloy which is primarily aluminum. These thermally conductive metal walls of hopper 82 include front and back side walls 136 and 138, left and right side walls 140 and 142, bottom wall 200 and front and back side walls 202 and 204 of housing 198, and spacers 216.

With primary reference to FIG. 13, hydraulic pump 344 includes a rotatable drive shaft 408 upon which a sheave 410 (FIGS. 11-12) is securely mounted to rotate with shaft 408. In the exemplary embodiment, sheave 410 is configured for use with sheave 44 (FIG. 1) and belt 46 such that engine 22 powers the rotation of drive sheave 44 to cause rotation of sheave 410 and shaft 408 via belt 46, thereby causing pump 344 to pump the hydraulic fluid through the hydraulic system. Pump 344 is secured to a pump mounting bracket 412 which is pivotally mounted to pivot about a vertical axis passing through a pivot 414 which is mounted on housing 198 via a pivot mounting bracket 416 secured to vertical segment 208 of front side wall 202. A lever 418 is secured to bracket 412 adjacent pivot 414 and extends away from pivot 414 in a direction opposite that of bracket 412. A spring 420 is mounted on pump 344 via a first connector 422 at one end of the spring and on the hopper via a second connector 424 to which the other end of the spring is connected. More particularly, first connector 422 is mounted on the pump housing and second connector 424 is secured to one of ribs 230.

Figure 12:
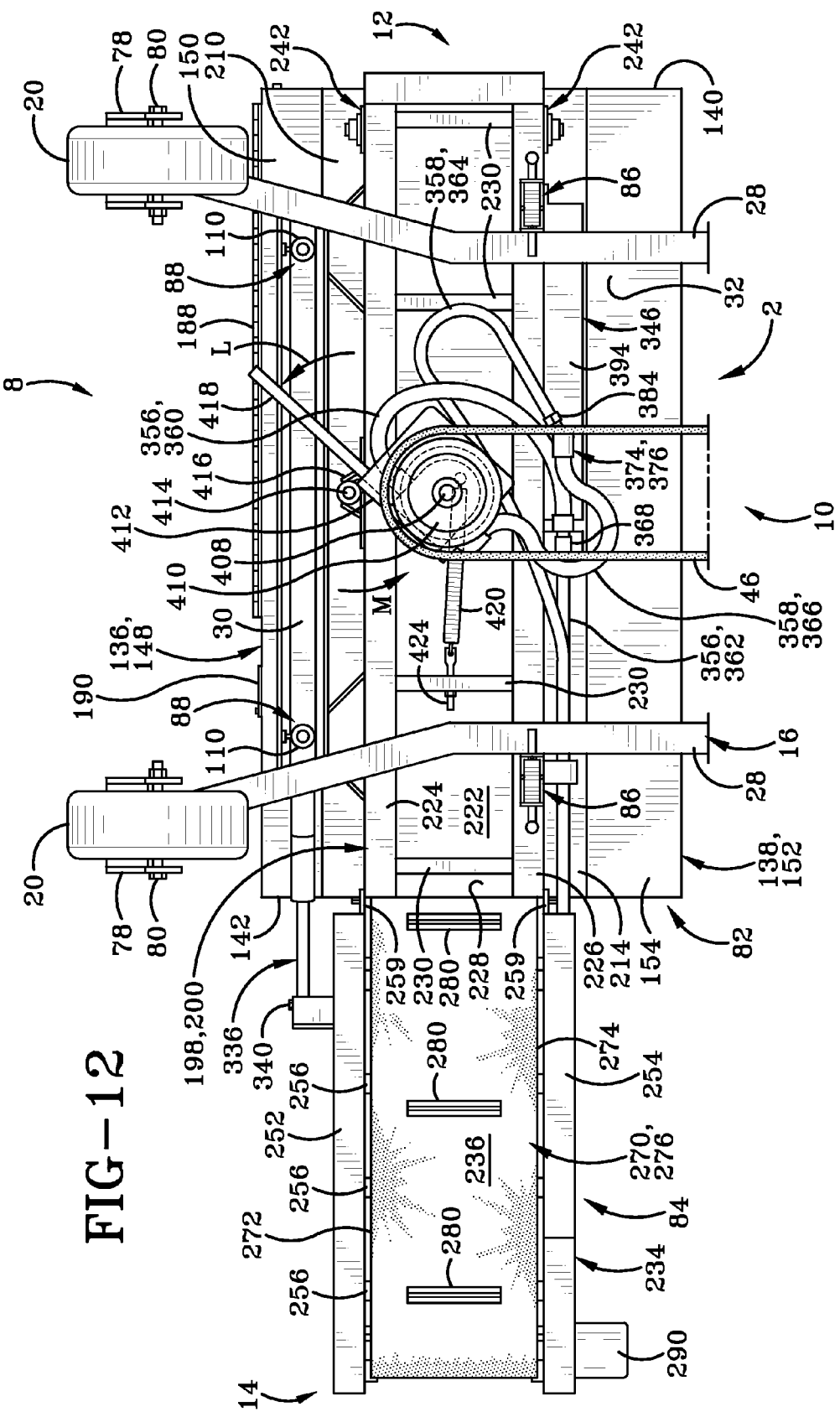
FIG. 12 is similar to FIG. 11 and shows the hydraulic pump and associated sheave in a loosened or dismounted position to allow the drive belt to be mounted or dismounted on the sheave.

Pivot 424 is offset from drive shaft 408 (which rotates about a vertical axis) whereby pump 344, shaft 408, sheave 410, bracket 412 and lever 418 are pivotable about the vertical axis of pivot 414 between an engaged position (FIGS. 1 and 11) in which belt 46 engages and wraps around sheave 410 and sheave 44 and a disengaged position in which belt 46 is disengaged from sheave 410 to facilitate the mounting and dismounting of belt 46 from sheave 410. To facilitate the mounting and dismounting of belt 46, the user may apply a force as shown at Arrow L in FIG. 12 to lever 418 to pivot the pump assembly about pivot 414 (Arrow M) from the engaged position to the disengaged position. Spring 420 biases the pump assembly to the engaged position of FIG. 11, whereby the force on the handle or lever 418 must overcome the spring bias of spring 420 to move the assembly from the engaged position to the disengaged position. Because the pump itself is pivotally mounted about pivot 414, flexible hoses forming segments 360 and 366 of the hydraulic lines flex during the movement between the engaged and disengaged positions as illustrated in FIGS. 11 and 12.

When assembly 2 is mounted on frame 16, a majority of the conveyor belt support assembly and conveyor belt 236 are positioned directly above mower deck mounting space 66 including all of section 232 and the inner portion of section 234, as well as pivot 258. Thus, all of ribs 238 and planks 248 are entirely directly above space 66, as are sealing strips 318 and 320. During the mounting of assembly 2 on frame 16, assembly 2 is lowered into position atop frame 16 such that sheave 410 moves downwardly through space 32 via the top and bottom entrance openings 34 and 36 thereof (FIG. 3) from a position above rails 28 and space 32 shown in FIGS. 3 and 6 to the mounted position shown in FIGS. 1 and 2 whereby in the exemplary embodiment, sheave 410 is adjacent or within the same space occupied by sheave 48 when deck 4 is mounted on frame 16. When assembly 2 is mounted on frame 16, sheave 410 is thus adjacent or within space 66 while the other components of the hydraulic pump assembly are within or adjacent and directly above space 66, including bracket 412, pivot 414 and lever 418. Portions of the hydraulic pump assembly may also be within space 32 when assembly 2 is mounted on frame 16. During the dismounting or detaching of assembly 2 from frame 16, sheave 410 and the various components of the hydraulic pump assembly just described move upwardly from their mounted positions from adjacent space 66 upwardly through space 32 via entrance openings 34 and 36 to a position upwardly of rails 28 and space 32.

Figure 19:
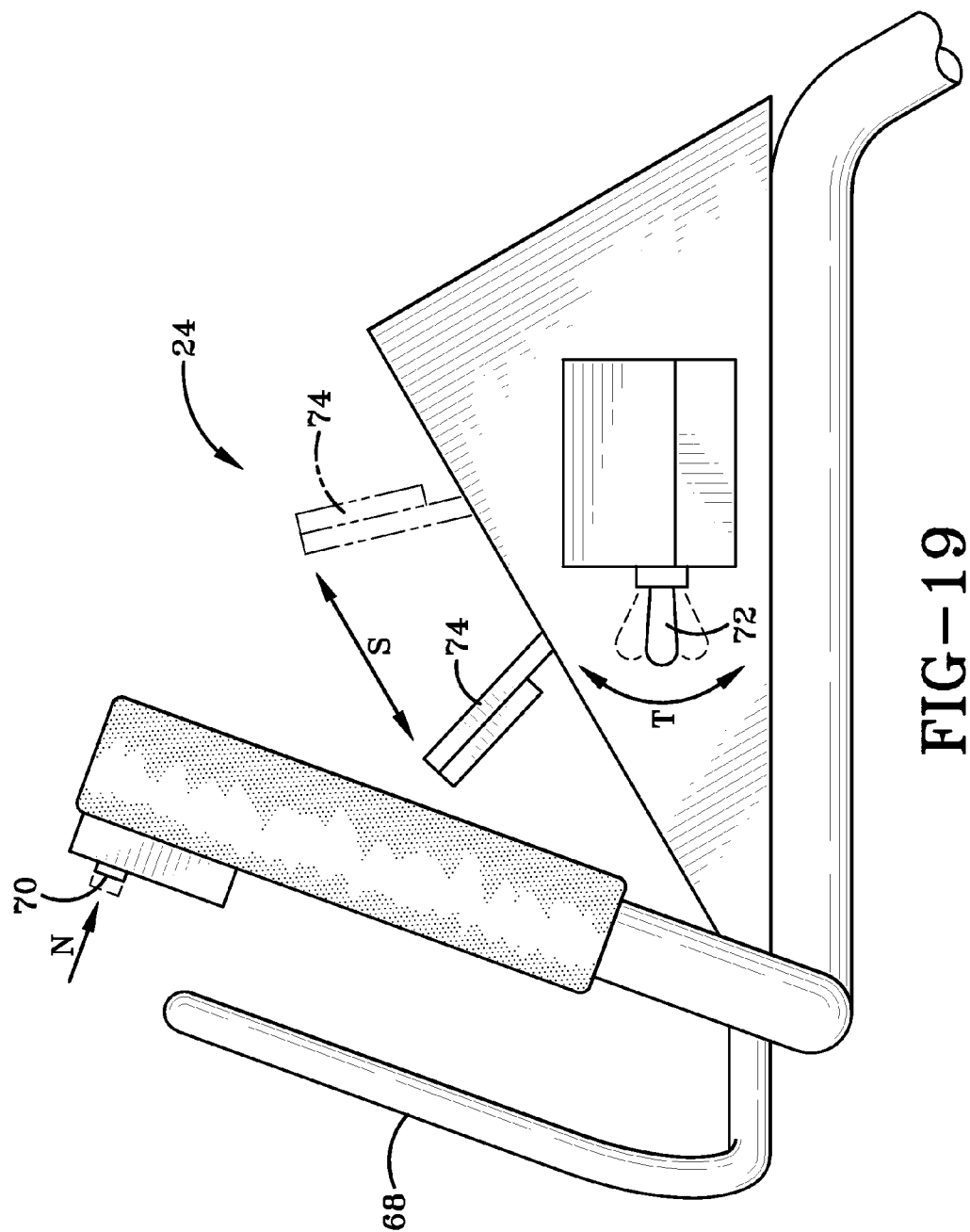
FIG. 19 is an enlarged side elevational view of the control section of the unit.
Figure 20:
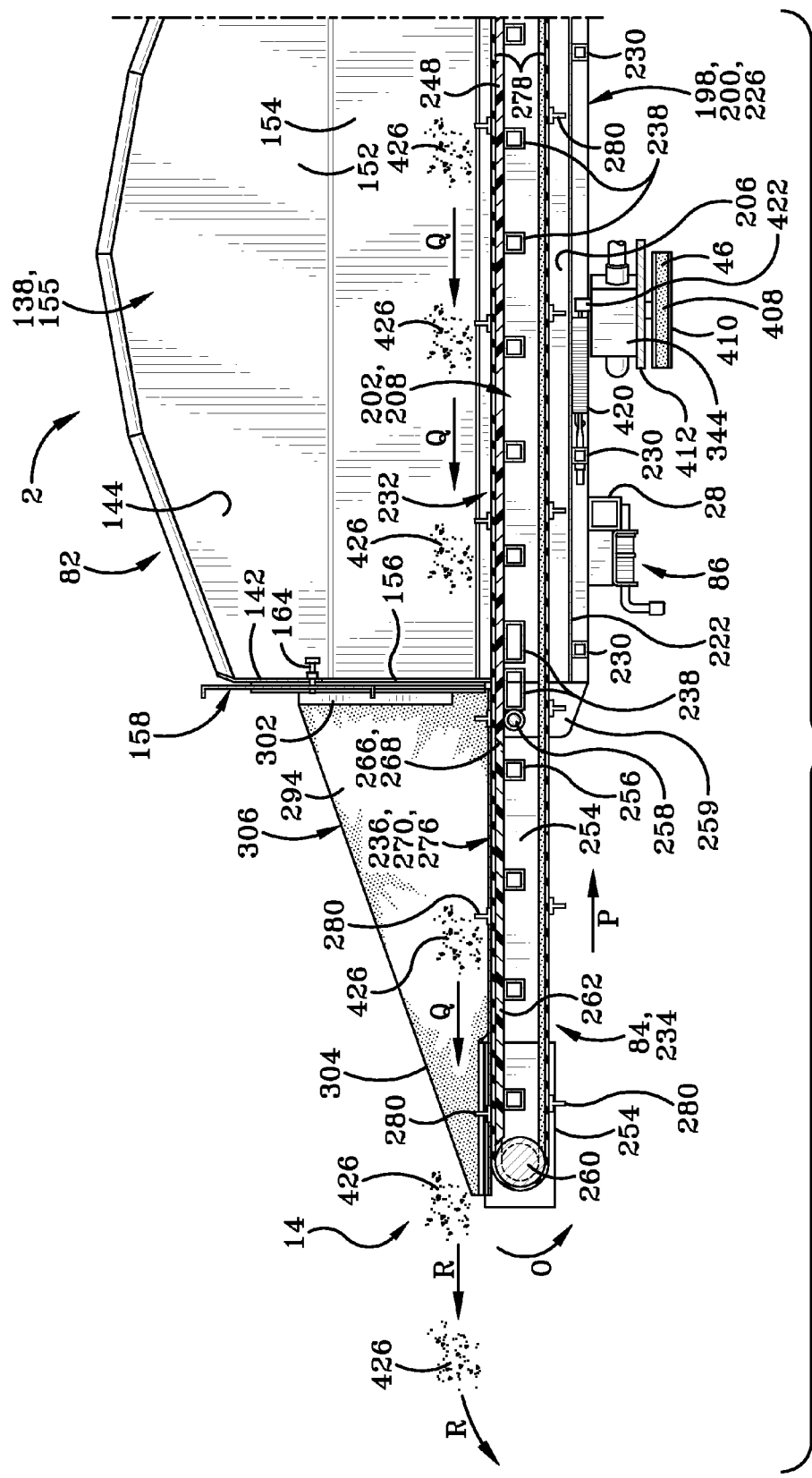
FIG. 20 is a sectional view similar to FIG. 16 with portions cut away showing revolving operation of the conveyor belt to discharge particulate material from within the hopper.

The operation of assembly 2 is now described with primary reference to FIGS. 19-22. As noted previously, assembly 2 may be operated while unit 1 is moving or when its travel is stopped. After the operator has turned on engine 22, he or she may push button 70 (Arrow N in FIG. 19) to initiate the operation of hydraulic pump 344, which is driven by the rotation of shaft 408 and sheave 410, and thus is powered by engine 22 via sheave 44 (FIG. 1), belt 46 and sheave 410. More particularly, the manipulation of button 70 is used to cause a clutch (not shown) of engine 22 to engage in order to drive rotation of shaft 408 in sheave 410. The operation of pump 344 thus pumps hydraulic fluid through the feed line to hydraulic motor 290 to drive rotation of roller 260 (Arrow O in FIG. 20) and thereby drive the revolving movement of conveyor belt 236. The horizontal axial movement of the bottom section of conveyor belt 236 is shown at Arrow P in FIG. 20. Arrows Q in FIG. 20 illustrate the horizontal axial movement of the top section of the conveyor belt as well as the horizontal axial movement of mulch or other particulate material 426 along the top section of the conveyor belt to discharge material 426 from within chamber 144 through exit opening 156 onto the extension section of the conveyor assembly within chute 306, and Arrows R illustrate material 426 being discharged or thrown outwardly from the end of the extension of the conveyor assembly so that the particulate material 426 falls to the ground. Conveyor belt 36 is thus operated when the conveyor assembly is in the extended operational position of FIG. 20, during which time sections 232 and 234 are fixed relative to frame 16.

As shown in FIG. 19, clutch 74 may be moved back and forth (Arrow S) to increase or decrease the speed or RPMs of engine 22 and the corresponding speed of rotation of shaft 42, sheave 44 (FIG. 1), sheave 410 and shaft 408, whereby pump 344 pumps fluid at a slower or faster rate to consequently decrease or increase the rotation of roller 260 and the revolving speed of conveyor belt 236. Throttle 74 may be operated to decrease the revolving speed of conveyor belt 236 to the degree that particulate material 426 essentially falls straight downwardly from adjacent the end of the extension of the conveyor assembly and may likewise be increased to thrown or shoot particulate material 426 outwardly beyond the end of the chute up to, for instance, a distance of about three to three and a half feet in the exemplary embodiment. Throttle 74 may thus also be positioned to throw material 426 to any desired distance within this range. Thus, while the conveyor assembly is in the extended position shown in FIG. 20, unit 1 may be driven or operated to travel as desired (primarily forward) while simultaneously throwing the particulate material 426 in desired locations. This is particularly useful for throwing mulch onto garden beds and the like. Gate 158 may be manually moved upwardly or downwardly and secured in position as desired to set the desired size of entrance opening 156 suited to a given scenario.

In the exemplary embodiment, the top portion of conveyor belt 236 moves in a single horizontal axial direction (Arrows P) so that material 426 likewise moves in this single direction along the top of the conveyor belt, thereby allowing better control of the material 426 as opposed to a broadcast spreader or other spreading devices which are configured for a widespread distribution. Material 426 is thus thrown directly off the end of conveyor 236 adjacent roller 260, the outer end of chute 306 and the outer end of section 234 whereby material moves directly from the conveyor belt through the air and onto the ground without additional manipulation by additional components after exiting the conveyor belt. Although the Figures illustrate that hopper 82 is formed with the exit opening 156 on the right side and the extension 234 extending outwardly to the right in order to discharge material 426 to the right, hopper 82 may easily be configured in the opposite manner such that material 426 is thrown to the left side. Thus, the conveyor assembly is configured to discharge material 426 in a direction which is substantially perpendicular to the direction of forward travel of unit 1. In either case, assembly 2 is configured to discharge material 426 from within hopper 82 with only a single conveyor belt 236, thus providing a simple and low cost configuration.

When the user no longer desires to discharge particulate material 426 from within hopper 82, the extension section of conveyor assembly 84 may be moved from the substantially horizontal extended operational position shown in FIG. 20 to the retracted stored position shown in FIG. 21. To achieve this, the operator may flip switch 72 (Arrow T in FIG. 19) from the neutral position shown in solid lines to one of the positions shown in dashed lines, thereby typically closing an electrical circuit to operate motor 342 to retract the piston of actuator 336 (Arrow U in FIG. 21) and thereby retract the extension section of the assembly by pivotal movement (Arrow V) about pivot 258 and the horizontal axis thereof. The outer end of the extension of the conveyor assembly 84, including roller 260 and motor 290, thus pivot upwardly and inwardly toward hopper 82 from the extended position to the retracted position. The extension section pivots from the extended to the retracted position at least 45, 50 or 55 degrees, typically at least 60 or 65 degrees and usually within the range of about 60 to 90 degrees.

Chute walls 294 fold up to a folded position in response to this retracting movement of the extension of assembly 84. As the extension of assembly 84 pivots upwardly toward the retracted position, conveyor belt 236 loosens around the support assembly whereby springs 246 expand and force carriage 242 with roller 240 away from the opposite end of the assembly adjacent roller 260 and away from exit opening 256 and the opposite side of hopper 82 (Arrow W). To reverse this process, the operator may simply flip switch 72 into the other of the dashed line positions shown in FIG. 19 to operate motor 342 to extend the piston in a direction opposite Arrow U and thereby cause the extension section to pivot downwardly in the direction opposite Arrow V to move the extension from the retracted position of FIG. 21 to the extended position of FIG. 20. Thus, chute walls 294 unfold and straighten into their unfolded substantially flat vertical positions in response to the movement of the extension section from the retracted position to the extended position. When the extension of conveyor assembly 84 is moved from the retracted stored position to the extended operational position, belt 236 tightens and presses against roller 240, thereby moving roller 240 and carriage 242 against the spring bias of springs 246 such that springs 246 are compressed. Thus, springs 246 maintains conveyor belt 236 in a sufficiently tightened position in the extended position of the extension of conveyor assembly 84. It is noted that in the retracted stored position of the conveyor assembly, conveyor belt 236 is not revolvable and thus is inoperable due to the slackness of belt 236.

The retraction of the extension section thus provides a narrower axial profile of assembly 2 and of unit 1. This is illustrated by the comparison of FIGS. 2 and 21. More particularly, as shown in FIG. 2, the left side 12 of assembly 2, hopper 82 and unit 1 and the extended right side 14 defined by the outer end of the extension of assembly 84 define therebetween an axial horizontal width W1 of assembly 2 and unit 1. In the retracted position of FIG. 21, left side 12 and a retracted left side 14A defined by the outer end of the extension of assembly 84 define therebetween an axial horizontal width W2 of assembly 2 and unit 1 which is substantially less than width W1. Width W2 is typically within a range of about 60 or 65% to about 85% of W1 and usually in a range of about 65 or 70% to about 75, 80, or 85%.

Figure 22:
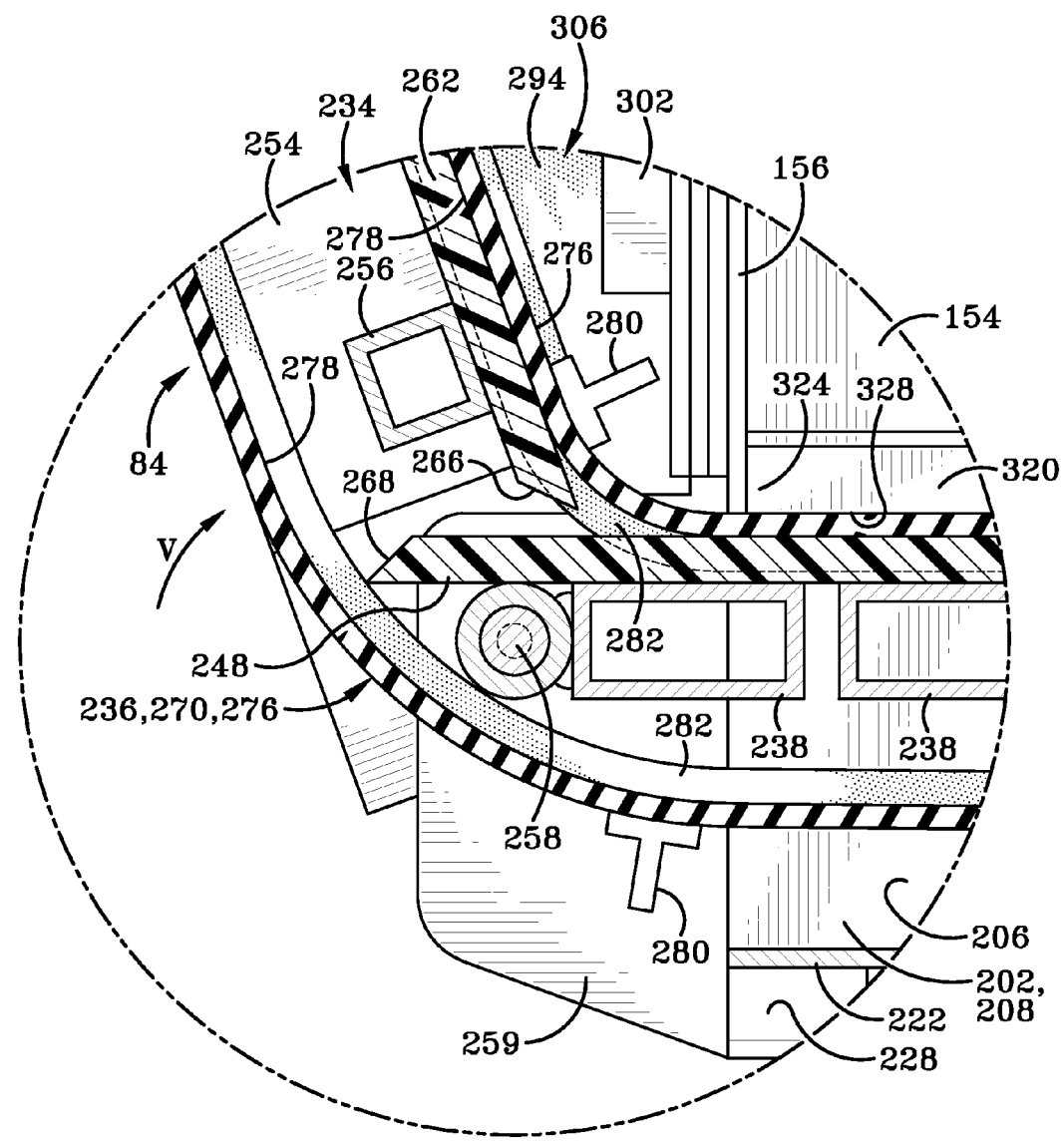
FIG. 22 is similar to FIG. 18 and shows the conveyor belt assembly in the retracted stored position.

FIGS. 18 and 22 respectively illustrate the conveyor assembly adjacent pivot 258 in the extended position and the retracted position. As previously discussed, beveled ends 266 and 268 are closely adjacent or abut one another in the extended position. In addition, planks 248 and 262 are parallel with their top surfaces substantially coplanar and their bottom surfaces substantially coplanar. In the retracted position of FIG. 22, end 266 is separated and spaced from end 268 such that end 266 is higher than and axially inwardly to the left of end 268 and thus higher than and to the left of its position in the extended position of FIG. 18. In addition, planks 262 move from a substantially horizontal position in the extended position to an upwardly extending position which is closer to vertical than to horizontal in the retracted position such that the top and bottom surfaces of planks 262 are no longer coplanar with the top and bottom surfaces of planks 248 respectively, but rather angled upwardly and axially outwardly relative thereto. FIG. 18 also shows that the conveyor belt upper and lower sections are in their entirety substantially horizontal in the extended position whereas in the retracted position, the upper and lower segments of conveyor belt 236 within hopper 82 remain substantially horizontal and the corresponding sections of the extension portion extend upwardly while portions of the conveyor belt therebetween are curved adjacent pivot 258.

In summary, the present invention provides a self-propelled unit including a functional assembly or attachment which may be permanently secured to the unit or removably attached. In the exemplary embodiment, the assembly comprises a hopper and conveyor assembly for respectively containing particulate material and discharging particulate material from within the hopper whereby the unit is configured for throwing mulch or other particulate material in a controlled manner as desired onto garden beds or elsewhere. The attachment of the present invention may be rapidly mounted on or detached from the frame of a self-propelled unit, no tools are required to effect this mounting or dismounting, and no warranty-voiding alteration is required to the original unit on which the attachment may be mounted as a retrofit attachment. Inasmuch as assembly 2 is configured to be mounted atop the frame of the self-propelled unit as opposed to being towed thereby, assembly 2 is in the exemplary embodiment free of ground engaging wheels or a hitch member for hitching to a hitch member of a self-propelled unit for towing. Although the unit may be configured to simultaneously carry mower deck 4 and assembly 2, mower deck 4 is typically removed from frame 16 when assembly 2 is mounted thereon to reduce the weight of the unit. Mower decks of the type shown in the Figures often weigh on the order of about 350 pounds. In the exemplary embodiment, assembly 2 has a weight of about 150 pounds.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

The invention claimed is:

1. A method comprising the steps of:
  detaching a mower deck from a frame of a mower;
  mounting on the frame an attachment which comprises a hopper and conveyor belt;
  placing particulate material into the hopper;
  revolving the conveyor belt to discharge the particulate material from the hopper;
  detaching the hopper and conveyor belt from the frame;
  mounting on the frame the mower deck; and
  mowing grass with the mower deck;
  wherein the steps of mounting on the frame or detaching from the frame either of the hopper and conveyor belt or the mower deck is accomplished without using tools.

2. A method comprising the steps of:
  detaching a mower deck from a frame of a mower;
  mounting on the frame an attachment which comprises a hopper and conveyor belt;
  placing particulate material into the hopper;
  revolving the conveyor belt to discharge the particulate material from the hopper;
  detaching the hopper and conveyor belt from the frame;
  mounting on the frame the mower deck; and
  mowing grass with the mower deck;
  wherein the step of mounting the hopper and conveyor belt or the mower deck is accomplished without drilling additional holes in the originally fabricated frame.

3. A method comprising the steps of:
  detaching a mower deck from a frame of a mower;
  mounting on the frame an attachment which comprises a hopper and conveyor belt;
  placing particulate material into the hopper;
  revolving the conveyor belt to discharge the particulate material from the hopper;
  detaching the hopper and conveyor belt from the frame;
  mounting on the frame the mower deck; and
  mowing grass with the mower deck;
  wherein the steps of mounting include mounting either of the hopper and conveyor belt or the mower deck in a location on the frame in front of where a human operator will be positioned.

4. A method comprising the steps of:
  detaching a mower deck from a frame of a mower;
  mounting on the frame an attachment which comprises a hopper and conveyor belt;
  placing particulate material into the hopper; and
  revolving the conveyor belt to discharge the particulate material from the hopper;
  wherein the step of mounting the hopper and conveyor belt includes engaging the hopper with the frame such that substantially the entire hopper and conveyor belt extend upwardly away from an upper surface of the frame.

5. A method comprising the steps of:
  detaching a mower deck from a frame of a mower;
  mounting on the frame an attachment which comprises a hopper and conveyor belt;
  placing particulate material into the hopper;
  revolving the conveyor belt to discharge the particulate material from the hopper;
  detaching the hopper and conveyor belt from the frame;
  mounting on the frame the mower deck; and
  mowing grass with the mower deck;
  wherein the step of mounting the mower deck includes engaging the mower deck with the frame such that substantially the entire mower deck extends downwardly away from a lower surface of the frame.

6. A method comprising the steps of:
  detaching a mower deck from a frame of a mower;
  mounting on the frame an attachment which comprises a hopper and conveyor belt;
  placing particulate material into the hopper; and
  revolving the conveyor belt to discharge the particulate material from the hopper;
  wherein the step of mounting the attachment includes engaging at least one front mounting mechanism on the hopper with the frame and engaging at least one rear mounting mechanism on the hopper with the frame.

7. The method as defined in claim 6, wherein the step of engaging at least one front mounting assembly includes the steps of:
  passing a rod extending downwardly from the hopper through a hole in a front section of the frame;
  sliding a sleeve over the rod so that the rod is received within a hole in the sleeve; and
  securing the sleeve on the rod.

8. The method as defined in claim 7, wherein the step of sliding the sleeve includes the step of sliding the sleeve upwardly until a top end of the sleeve abuts or is closely adjacent a downwardly facing surface of the frame.

9. The method as defined in claim 7, wherein the step of securing the sleeve comprises the step of:
  rotating a threaded shaft within a threaded hole defined in the sleeve.

10. The method as defined in claim 9, further comprising the step of detaching the attachment from the frame, including the steps of:
  unscrewing the threaded shaft;
  sliding the sleeve off of the rod; and
  lifting the attachment off of the frame, including the step of sliding the rod out of the hole in the front section of the frame.

11. The method as defined in claim 6, wherein the at least one rear mounting assembly comprises a mounting member movably mounted on the hopper; and the step of engaging the at least one rear mounting assembly on the hopper with the frame includes the steps of:

sliding a leg of the mounting member through holes defined respectively in spaced apart legs of a bracket which is mounted on the hopper to position the leg of the mounting member directly below a rail of the frame so that the leg of the mounting member serves as a stop which engages the rail to prevent upward movement of the attachment.

12. The method as defined in claim 11, further comprising the step of detaching the attachment from the frame, including the steps of:

sliding the leg of the mounting member through the holes in the legs of the bracket so that the mounting member is withdrawn to a degree so that the leg of the mounting member is no longer directly below the rail of the frame;
    lifting the hopper and conveyor off the frame.

13. The method as defined in claim 12, further comprising the steps of:

compressing a coil spring which encircles a portion of the leg of the mounting member; and
    rotating the mounting member while the spring is compressed to allow a pin which extends radially outwardly from the leg of the mounting member to engage a pin secured to the mounting bracket whereby the pins serve as retaining members to retain the mounting member in an unsecured position.

14. A method comprising the steps of:

detaching a mower deck from a frame of a mower;
    mounting on the frame an attachment which comprises a hopper and conveyor belt;
    placing particulate material into the hopper;
    revolving the conveyor belt to discharge the particulate material from the hopper;
    detaching the hopper and conveyor belt from the frame;
    mounting on the frame the mower deck; and
    mowing grass with the mower deck;
    wherein the method of mounting the mower includes:
    inserting at least one front rod extending upwardly from a housing of the mower deck through a forward hole defined in the frame;
    inserting at least one rear rod extending upwardly from the housing of the mower deck through a rearward hole defined in the frame; and
    securing the at least one front rod and at least one rear rod in place.

15. The method as defined in claim 14, wherein the step of securing includes:

passing a first cotter pin through a hole formed in the at least one front rod and a second cotter pin through a hole formed in the at least one rear rod.

16. The method as defined in claim 15, further comprising the steps of:

providing a drive belt mounted on a first sheave rotatably connected to an engine mounted on the frame; and
    mounting the drive belt on a second sheave rotatably mounted on the mower deck.

17. The method as defined in claim 15 wherein the step of detaching the mower deck includes the steps of:

removing the first cotter pin and second cotter pin from the respective at least one of the front and rear rods;
    removing the at least one front rod and the at least one rear rod respectively from the forward and rearward holes in the frame; and
    lowering the mower deck away from the frame.

18. A method comprising the steps of:

detaching a mower deck from a frame of a mower;
    mounting on the frame an attachment which comprises a hopper and conveyor belt;
    placing particulate material into the hopper; and
    revolving the conveyor belt to discharge the particulate material from the hopper;
    wherein the step of mounting the hopper includes the step of:
    sliding a hopper sleeve which is secured to the hopper over a caster mount sleeve which extends upwardly from a caster so that the caster mount sleeve is received within a hole of the hopper sleeve.

19. A method comprising the steps of:

detaching a mower deck from a frame of a mower;
    mounting on the frame an attachment which comprises a hopper and conveyor belt;
    placing particulate material into the hopper; and
    revolving the conveyor belt to discharge the particulate material from the hopper;
    wherein the step of mounting the attachment includes the step of:
    lowering the attachment to insert a rod extending downwardly from a lower portion of the hopper through a hole defined in the frame.

20. The method of claim 19 further comprising the steps of:

sliding a sleeve over the rod so that the rod is received within a hole in the sleeve; and
    securing the sleeve on the rod.

21. The method of claim 20 wherein the step of securing the sleeve comprises the step of rotating a threaded shaft within a threaded hole defined in the sleeve.

22. A method comprising the steps of:

detaching a mower deck from a frame of a mower;
    mounting on the frame an attachment which comprises a hopper and conveyor belt;
    placing particulate material into the hopper;
    revolving the conveyor belt to discharge the particulate material from the hopper,
    detaching the hopper and conveyor belt from the frame;
    mounting on the frame the mower deck; and
    mowing grass with the mower deck;
    wherein the frame includes at least one hole defined in a front section thereof; and wherein the mower deck includes a front mounting assembly and the attachment includes a front mounting mechanism; and wherein the method includes:
    selectively engaging the the front mounting assembly of the mower deck and the front mounting mechanism of the attachment with the same at least one hole.

\* \* \* \* \*

UNITED STATES PATENT AND TRADEMARK OFFICE
CERTIFICATE OF CORRECTION

| | |
|---|---|
| PATENT NO. | : 9,137,947 B2 |
| APPLICATION NO. | : 14/087651 |
| DATED | : September 22, 2015 |
| INVENTOR(S) | : Hoppel |

Page 1 of 1

It is certified that error appears in the above-identified patent and that said Letters Patent is hereby corrected as shown below:

In the claims

Column 22, line 57 Claim 9 change "the sleeve." to --the sleeve until the shaft engages the rod.--

Column 23, line 17 Claim 12 change "rail of the frame;" to --rail of the frame; and--

Signed and Sealed this
Twenty-second Day of March, 2016

Michelle K. Lee
*Director of the United States Patent and Trademark Office*